United States Patent
Melvin et al.

(10) Patent No.: US 7,650,605 B2
(45) Date of Patent: *Jan. 19, 2010

(54) METHOD AND APPARATUS FOR IMPLEMENTING ATOMICITY OF MEMORY OPERATIONS IN DYNAMIC MULTI-STREAMING PROCESSORS

(75) Inventors: Stephen Melvin, San Francisco, CA (US); Mario D. Nemirovsky, Saratoga, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 11/676,541

(22) Filed: Feb. 20, 2007

(65) Prior Publication Data

US 2007/0294702 A1 Dec. 20, 2007

Related U.S. Application Data

(63) Continuation of application No. 09/592,106, filed on Jun. 12, 2000, now Pat. No. 7,257,814, which is a continuation-in-part of application No. 09/216,017, filed on Dec. 16, 1998, now Pat. No. 6,477,562, and a continuation-in-part of application No. 09/240,012, filed on Jan. 27, 1999, now Pat. No. 6,292,888, and a continuation-in-part of application No. 09/273,810, filed on Mar. 22, 1999, now Pat. No. 6,389,449, and a continuation-in-part of application No. 09/312,302, filed on May 14, 1999, now Pat. No. 7,020,879.

(51) Int. Cl.
*G06F 9/00* (2006.01)
*G06F 7/38* (2006.01)
*G06F 13/28* (2006.01)
*G06F 12/00* (2006.01)

(52) U.S. Cl. .............. 718/104; 712/225; 711/152; 710/200

(58) Field of Classification Search ............ 712/228, 712/229, 225, 42; 711/163, 152, 145; 718/104; 710/200
See application file for complete search history.

(56) References Cited

U.S. PATENT DOCUMENTS 4,197,579 A 4/1980 Forsman et al.

(Continued)

FOREIGN PATENT DOCUMENTS

EP 0764900 A2 9/1996

(Continued)

OTHER PUBLICATIONS

Grunewald et al. "Confidence Estimation for Speculation Control." Computer Architecture, 1998. Proceedings. The 25th Annual International Symposium on Barcelona, Spain. Jun. 27, 1998-Jul. 1, 1998. Los Alamitos, CA. USA IEEE Comput. Soc, US. pp. 122-131, XP010291387. ISBN: 0-8186-8491-7.

(Continued)

*Primary Examiner*—Larry D Donaghue
(74) *Attorney, Agent, or Firm*—Sterne, Kessler, Goldstein & Fox P.L.L.C.

(57) ABSTRACT

A multi-streaming processor has a plurality of streams for streaming one or more instruction threads, a set of functional resources for processing instructions from streams, and a lock mechanism for locking selected memory locations shared by streams of the processor, the hardware-lock mechanism operating to set a lock when an atomic memory sequence is started and to clear a lock when an atomic memory sequence is completed. In preferred embodiments the lock mechanism comprises one or more storage locations associated with each stream of the processor, each storage location enabled to store a memory address a lock bit, and a stall bit. Methods for practicing the invention using the apparatus are also taught.

16 Claims, 11 Drawing Sheets

| Stream | Address | Lock Bit | Stall Bit |
|---|---|---|---|
| S1 | 715 | 1 | 0 |
| S1 | 715 | 0 | 1 |
| S1 | 717 | 0 | 1 |
| S1 | 717 | 1 | 0 |

*(Hardware Lock)*

U.S. PATENT DOCUMENTS

| | | | |
|---|---|---|---|
| 4,200,927 | A | 4/1980 | Hughes et al. |
| 5,142,676 | A | 8/1992 | Fried et al. |
| 5,291,586 | A | 3/1994 | Jen et al. |
| 5,309,173 | A | 5/1994 | Izzi et al. |
| 5,321,823 | A | 6/1994 | Grundmann et al. |
| 5,361,337 | A | 11/1994 | Okin |
| 5,390,307 | A | 2/1995 | Yoshida |
| 5,461,722 | A | 10/1995 | Goto |
| 5,511,210 | A | 4/1996 | Nishikawa et al. |
| 5,535,365 | A | 7/1996 | Barriuso et al. |
| 5,542,088 | A | 7/1996 | Jennings, Jr. et al. |
| 5,546,593 | A | 8/1996 | Kimura et al. |
| 5,561,776 | A | 10/1996 | Popescu et al. |
| 5,572,704 | A | 11/1996 | Bratt et al. |
| 5,600,837 | A | 2/1997 | Artieri |
| 5,604,877 | A | 2/1997 | Hoyt et al. |
| 5,632,025 | A | 5/1997 | Bratt et al. |
| 5,649,144 | A | 7/1997 | Gostin et al. |
| 5,694,572 | A | 12/1997 | Ryan |
| 5,701,432 | A | 12/1997 | Wong et al. |
| 5,713,038 | A | 1/1998 | Motomura |
| 5,737,590 | A | 4/1998 | Hara |
| 5,745,778 | A | 4/1998 | Alfieri |
| 5,748,468 | A | 5/1998 | Notenboom et al. |
| 5,758,142 | A | 5/1998 | McFarling et al. |
| 5,784,613 | A | 7/1998 | Tamirsa |
| 5,812,811 | A | 9/1998 | Dubey et al. |
| 5,815,733 | A | 9/1998 | Anderson et al. |
| 5,852,726 | A | 12/1998 | Lin et al. |
| 5,860,017 | A | 1/1999 | Sharangpani et al. |
| 5,867,725 | A | 2/1999 | Fung et al. |
| 5,913,049 | A | 6/1999 | Shiell et al. |
| 5,913,054 | A | 6/1999 | Mallick et al. |
| 5,933,627 | A | 8/1999 | Parady |
| 5,946,711 | A | 8/1999 | Donnelly |
| 5,987,492 | A | 11/1999 | Yue |
| 6,016,542 | A | 1/2000 | Gottlieb et al. |
| 6,018,759 | A | 1/2000 | Doing et al. |
| 6,029,228 | A | 2/2000 | Cai et al. |
| 6,052,708 | A | 4/2000 | Flynn et al. |
| 6,061,710 | A | 5/2000 | Eickemeyer et al. |
| 6,076,157 | A | 6/2000 | Borkenhagen et al. |
| 6,105,127 | A | 8/2000 | Kimura et al. |
| 6,115,802 | A | 9/2000 | Tock et al. |
| 6,119,203 | A | 9/2000 | Snyder et al. |
| 6,192,384 | B1 | 2/2001 | Dally et al. |
| 6,212,544 | B1 | 4/2001 | Borkenhagen et al. |
| 6,260,077 | B1 | 7/2001 | Rangarajan et al. |
| 6,260,138 | B1 | 7/2001 | Harris |
| 6,266,752 | B1 | 7/2001 | Witt et al. |
| 6,272,624 | B1 | 8/2001 | Giacalone et al. |
| 6,292,888 | B1 | 9/2001 | Nemirovsky et al. |
| 6,308,261 | B1 | 10/2001 | Morris et al. |
| 6,356,996 | B1 | 3/2002 | Adams |
| 6,389,449 | B1 | 5/2002 | Nemirovsky et al. |
| 6,430,593 | B1 | 8/2002 | Lindsley |
| 6,442,675 | B1 | 8/2002 | Derrick et al. |
| 6,477,562 | B2 | 11/2002 | Nemirovsky et al. |
| 6,487,571 | B1 | 11/2002 | Voldman |
| 6,493,749 | B2 | 12/2002 | Paxhia et al. |
| 6,502,185 | B1 | 12/2002 | Keller et al. |
| 6,535,905 | B1 | 3/2003 | Kalafatis et al. |
| 6,789,100 | B2 | 9/2004 | Nemirovsky et al. |
| 6,792,524 | B1 | 9/2004 | Peterson et al. |
| 7,020,879 | B1 | 3/2006 | Nemirovsky et al. |
| 7,035,997 | B1 | 4/2006 | Musoll et al. |
| 7,237,093 | B1 | 6/2007 | Musoll et al. |
| 7,257,814 | B1* | 8/2007 | Melvin et al. ............ 718/104 |
| 7,467,385 | B2 | 12/2008 | Nemirovsky et al. |
| 2002/0002607 | A1 | 1/2002 | Ludovici et al. |
| 2002/0062435 | A1 | 5/2002 | Nemirovsky et al. |
| 2003/0084269 | A1 | 5/2003 | Drysdale et al. |
| 2005/0081214 | A1 | 4/2005 | Nemirovsky et al. |
| 2007/0143580 | A1 | 6/2007 | Musoll et al. |
| 2008/0040577 | A1 | 2/2008 | Nemirovsky et al. |
| 2009/0125660 | A1 | 5/2009 | Nemirovsky et al. |
| 2009/0187739 | A1 | 7/2009 | Nemirovsky et al. |

FOREIGN PATENT DOCUMENTS

| | | |
|---|---|---|
| EP | 0806730 A2 | 11/1997 |
| EP | 0827071 A2 | 3/1998 |
| EP | 0953903 A2 | 11/1999 |
| GB | 2321984 A | 6/1998 |
| JP | 2103630 | 10/1988 |
| JP | 63254530 | 10/1988 |
| JP | 4335431 | 11/1992 |
| JP | 546379 | 2/1993 |
| JP | 09506752 A2 | 6/1997 |
| JP | 1011301 A2 | 1/1998 |
| JP | 10124316 A2 | 5/1998 |
| JP | 10207717 A2 | 8/1998 |
| WO | WO9427216 A1 | 11/1994 |
| WO | WO0023891 A1 | 4/2000 |
| WO | WO0036487 A2 | 6/2000 |

OTHER PUBLICATIONS

Oehring et al. "Simultaneous Multithreading and Multimeadia." Proceedings of the workshop on multithreaded execution, architecture and compilation. 1999, XP002462989. Orlando, FL, USA.

Kessler, R.E. et al. "The Alpha 21264 Microprocessor Architecture." Computer Design: VLSI In Computers and Processors, 1998. ICCD '98. Proceedings. International Conference on Austin, TX, USA Oct. 5-7, 1998. Los Alamitos, CA, USA, IEEE Comput. Soc, US. pp. 90-95. XP010310339. ISBN: 0-8186-9099-2.

Tullsen D.M. et al. "Exploiting Choice: Instruction Fetch and Issue on an Implementable Simultaneous Multithreading Processor." Institute of Electrical and Electronics Engineers Association for Computing Machinery. Proceedings of the 23rd Annual Symposium on Computer Architecture. Philadelphia. May 22-24, 1996. pp. 191-202. XP000679354. ISBN: 0-89791-786-3.

Jacobson et al. "Assigning Confidence to Conditional Branch Predictions." Proceedings of the 29th Annual IEEE/ACM International Symposium on Microarchitecture. Dec. 2-4, 1996. pp. 142-152. XP000724367. ISBN: 0-8186=7641-8.

Nemirovsky, Mario D., "DISC: A Dynamic Instruction Stream Computer," 1990, UMI, Ann Arbor, MI.

Diefendorff, Keith, "Compaq Chooses SMT for Alpha," Dec. 6, 1999, Microprocessor Report.

Diefendorff, Keith, "WinChip 4 Thumbs Nose At ILP," Microprocessor Report, Dec. 7, 1998, vol. 12, No. 16.

Diefendorff, Keith, "Jalapeño Powers Cyrix's M3," Microprocessors Report, Nov. 16, 1998, vol. 12, No. 15.

Slater, Michael, "Rise Joins x86 Fray with mP6," Microprocessor Report, Nov. 16, 1998, vol. 12, No. 15.

Eggers et al., "Simultaneous Multithreading: A Platform for Next-Generation Processors," IEEE Micro, Sep./Oct. 1997.

Becker et al., "The PowerPC 601 Microprocessor" IEEE Micro, Oct. 1993.

Steere et al., "A Feedback-Driven Proportion Allocator for Real-Rate Scheduling," Proceedings of the Third Symposium on Operating Systems Design and Implementation, pp. 145-158, Feb. 1999., http://citeseer.ist.psu.edu/steere99feedbackdriven.html.

Yamamoto, Wayne, "An Analysis of Multistreamed, Superscalar Processor Architectures," University of California Santa Barbara Dissertation. Dec. 1995. Santa Barbara, US.

Cui et al., "Parallel Replacement Mechanism for MultiThread," Advances in Parallel and Distributed Computing, 1997. Proceedings, IEEE, Mar. 21, 1977, pp. 338-344.

Yamamoto et al. "Increasing Superscalar Performance Through Multistreaming." Parallel Architectures and Compilation Techniques (PACT '95). 1995.

Tullsen et al., "Simultaneous Multithreading: Maximizing on-chip parallelism," In Proceedings of the 22nd Annual International Symposium on Computer Architecture, pp. 392-403, Jun. 22-24, 1995. http://citeseer.csail.mit.edu/tullsen95simultaneous.html.

The PowerPC Architecture: A Specification for a New Family of RISC Processors. $2^{nd}$ Ed. May 1994. pp. 70-72. Morgan Kaufmann. San Francisco, US.

MC68020 32-Bit Microprocessor User's Manual, Third Edition, 1989, pp. 3-125, 3-126, and 3-127, Prentice Hall, New Jersey.

Potel, M.J., Real-Time Playback in Animation Systems, Proceedings of the 4th Annual Conference on Computer Graphics and Interactive Techniques, 1977, pp. 72-77, San Jose, CA.

Arm Architecture Reference Manual. 1996. pp. 3-41, 3-42, 3-43, 3-67, and 3-68. Prentice Hall, NJ, US.

ESA/390 Principles of Operation. IBM Online Publications Center Reference No. SA22-7201-08. Table of Contents and paras. 7.5.31 and 7.5.70. IBM Corporation. Boulder, CO, US.

MC88110 Second Generation RISC Microprocessor User's Manual. 1991. pp. 10-66, 10-67, and 10-71. Motorola, Inc.

Diefendorff, Keith et al. "Organization of the Motorola 88110 Superscalar RISC Microprocessor." IEEE Journal of Microelectronics. Apr. 1992. pp. 40-63. vol. 12, No. 2. IEEE. New York, NY, US.

Kane, Gerry. PA-RISC 2.0 Architecture. 1996, pp. 7-106 and 7-107. Prentice Hall. NJ, US.

U.S. Appl. No. 09/592,106, filed Jun. 12, 2000, Melvin et al.

U.S. Appl. No. 09/616,385, filed Jul. 14, 2000, Musoll et al.

U.S. Appl. No. 09/312,302, filed May 15, 1999, Nemirovsky et al.

U.S. Appl. No. 09/629,805, filed Jul. 31, 2000, Nemirovsky et al.

Diefendorff et al. "AltiVec Extension to PowerPC Accelerates Media Processing." IEEE Journal of Microelectronics. vol. 20, No. 2 (2000): pp. 85-95.

Pai et al. "An Evaluation of Memory Consistency Models for Shared-Memory Systems with ILP Processors." Proceedings of ASPLOS-VII, Oct. 1996: pp. 12-23, ACM, Inc.

Grunewald et al. "Towards Extremely Fast Context Switching in a Block Multithreaded Processor." Proceedings of EUROMICRO 22, 1996. pp. 592-599.

Bradford et al. "Efficient Synchronization for Multithreaded Processors." Workshop on Multithreaded Execution, Architecture, and Compilation. Jan.-Feb. 1998. pp. 1-4.

Tullsen et al. Supporting Fine-Grained Synchronization on a Simultaneous Multithreading Processor, USCD CSE Technical Report CS 98-587, Jun. 1998, all pages, US.

Fiske et al. Thread prioritization: A Thread Scheduling Mechanism for Multiple-Context Parallel Processors. Proceedings of the First IEEE Symposium on High-Performance Computer Architecture. Jan. 1995. pp. 210-221. Raleigh, NC, US.

Yamamoto et al. "Performance Estimation of Multistreamed, Superscalar Processors," 27nd Annual Hawaii International Conference on Systems Sciences, 1994, pp. 195-204, IEEE.

Yoaz et al. "Speculation Techniques for Improving Load Related Instruction Scheduling," 1999, pp. 42-53, IEEE.

Kessler, R.E., "The Alpha 21264 Microprocessor: Out-of-Order Execution at 600 Mhz", Aug. 1998, COMPAQ Computer Corporation, Shrewsbury, MA, USA.

Nemirovsky et al. Quantitative Study on Data Caches on a Multistreamed Architecture proceedings of the MTEAC'98 (In conjunction with HPCA-4), Las Vegas, Nevada, Feb. 1998. http://citeseer.ist.psu.edu/nemirovsky98quantitative.html.

Li et al. Design and Implementation of a Multiple-Instruction-Stream Multiple-Execution-Pipeline Architecture. Seventh IASTED International Conference on Parallel and Distributed Computing and Systems, pp. 477-480, Oct. 1995.

Donaldson et al. "DISC: Dynamic Instruction Stream Computer, An Evaluation of Performance." 26th Hawaii Conference on Systems Sciences. vol. 1. 1993. pp. 448-456.

Thekkath et al. The Effectiveness of Multiple Hardware Contexts. In Proceedings of the 6th International Conference on Architectural Support for Programming Languages and Operating Systems, pp. 328-337, San Jose, CA, Oct. 1994. ACM.

Nemirovsky, Mario D., "DISC: Dynamic Instruction Stream Computer," ACM, 1991, pp. 163-171.

Mcfarling, Scott. Combining Branch Predictors. WRL Technical Note TN-36. Jun. 1993. pp. 11-12. Digital Western Research Laboratory. Palo Alto, CA, US.

Ungerer et al. A Survey of Processors with Explicit Multithreading. ACM Computing Surveys, vol. 35, No. 1. Mar. 2003. pp. 29-63.

Kapps et al. "VAX Assembly Language and Architecture." Prindle, Weber & Schmidt. Boston, 1985. pp. 239-241.

Tanenbaum, Andrew S. "Structured Computer Organization." 2nd Edition, 1984, Prentice-Hall, pp. 10-12 and 204-221.

"Parallel Long Move Instruction." IBM Technical Disclosure Bulletin. IBM Corp, New York, US. vol. 33, No. 10A. Mar. 1, 1991. pp. 21-22. XP000109942 ISSN: 0018-8689.

Plant et al. "Data Length Calculation Hardware" IBM Technical Disclosure Bulletin, IBM Corp. New York, US. vol. 19, No. 1, Jun. 1, 1976. pp. 55-56. XP002333145. ISSN: 0018-8689.

Nemirovsky et al., U.S. Appl. No. 12/432,227, filed Apr. 29, 2009, entitled "Interrupt and Exception Handling for Multi-Streaming Digital Processors".

Tullsen et al., "Supporting Fine-Grained Synchronization on a Simultaneous Multithreading Processor," Proceedings of the 5th International Symposium on High Performance Computer Architecture, Jan. 1999, 5 pages.

Examination Report, dated Apr. 18, 2008, for European Patent Appl. No. 01952463.6, 10 pages.

Examination Report, dated May 14, 2009, for European Patent Appl. No. 01952463.6, 5 pages.

Office Communication, dated May 20, 2003, for U.S. Appl. No. 09/595,776, filed Jun. 16, 2000, 15 pages.

Office Communication, dated Nov. 10, 2003, for U.S. Appl. No. 09/595,776, filed Jun. 16, 2000, 16 pages.

Office Communication, dated May 7, 2004, for U.S. Appl. No. 09/595,776, filed Jun. 16, 2000, 18 pages.

Office Communication, dated Oct. 19, 2004, for U.S. Appl. No. 09/595,776, filed Jun. 16, 2000, 19 pages.

Office Communication, dated May 13, 2005, for U.S. Appl. No. 09/595,776, filed Jun. 16, 2000, 21 pages.
Office Communication, dated Dec. 14, 2005, for U.S. Appl. No. 09/595,776, filed Jun. 16, 2000, 22 pages.
Office Communication, dated Jun. 5, 2003, for U.S. Appl. No. 09/616,385, filed Jul. 14, 2000, 6 pages.
Office Communication, dated Nov. 18, 2003, for U.S. Appl. No. 09/616,385, filed Jul. 14, 2000, 5 pages.
Office Communication, dated Dec. 10, 2004, for U.S. Appl. No. 09/629,805, filed Jul. 31, 2000, 6 pages.
Office Communication, dated Dec. 14, 2005, for U.S. Appl. No. 09/629,805, filed Jul. 31, 2000, 8 pages.
Office Communication, dated Aug. 23, 2006, for U.S. Appl. No. 09/629,805, filed Jul. 31, 2000, 7 pages.
Office Communication, dated Feb. 8, 2007, for U.S. Appl. No. 09/629,805, filed Jul. 31, 2000, 7 pages.
Office Communication, dated Aug. 29, 2007, for U.S. Appl. No. 09/629,805, filed Jul. 31, 2000, 5 pages.
Office Communication, dated Nov. 19, 2007, for U.S. Appl. No. 09/629,805, filed Jul. 31, 2000, 5 pages.
Office Communication, dated Mar. 19, 2008, for U.S. Appl. No. 09/629,805, filed Jul. 31, 2000, 7 pages.
Office Communication, dated Aug. 7, 2008, for U.S. Appl. No. 09/629,805, filed Jul. 31, 2000, 7 pages.
Office Communication, dated Apr. 20, 2009, for U.S. Appl. No. 09/629,805, filed Jul. 31, 2000, 9 pages.
Office Communication, dated Feb. 25, 2009, for U.S. Appl. No. 10/921,077, filed Aug. 18, 2004, 8 pages.
Office Communication, dated Mar. 7, 2008, for U.S. Appl. No. 11/278,874, filed Apr. 6, 2006, 11 pages.
Office Communication, dated Nov. 14, 2008, for U.S. Appl. No. 11/278,874, filed Apr. 6, 2006, 25 pages.
US 7,178,007, 02/2007, Musoll et al. (withdrawn)

* cited by examiner

|  | Supervisory | Enable | Disable | Priorities | Interrupts |
|---|---|---|---|---|---|
| Stream 1 | ● |  | ● |  |  |
| Stream 2 | ● |  |  |  | ● |
| Stream 3 |  |  | ● |  |  |

Control Authorization for Stream 0

*Fig. 1B*

| Integer 1 | Integer 2 | Integer 3 | Integer 4 | Float Pt. 1 | Float Pt. 2 | Float Pt. 3 | Float Pt. 4 | Branch Unit 1 | Branch Unit 3 | Branch Unit 2 | Branch Unit 4 |
|---|---|---|---|---|---|---|---|---|---|---|---|
| ● | ● | ● |  |  |  |  |  | ● |  |  |  |

Hard Resource Assignment for Stream 0

*Fig. 1C*

| | | | |
|---|---|---|---|
| Execution | ● | ● | |
| Interrupt | | ● | ● |
| Integer | ● | ● | ● |
| Floating Point | ● | | |
| Branch | | ● | ● |

Priorities for Stream 0

*Fig. 1D*

| Master | Enabled/Disabled | Sleep Mode |
|---|---|---|
| ● | ● | |

Control Indicators for Stream 0

*Fig. 1E*

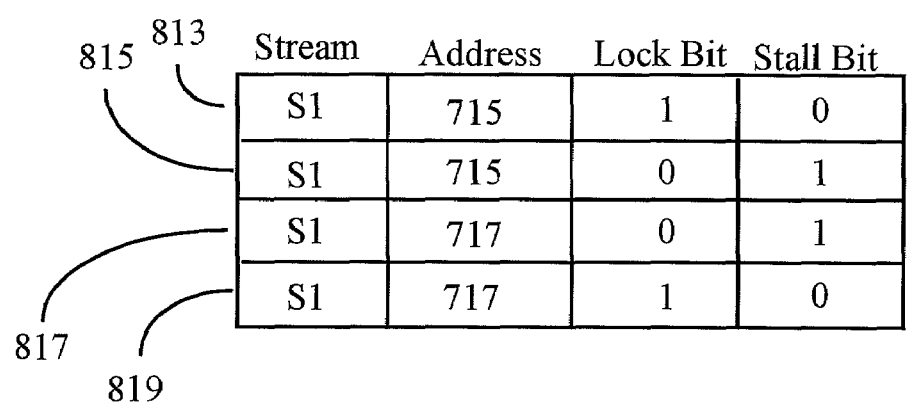
*Fig. 8 (Hardware Lock)*

METHOD AND APPARATUS FOR IMPLEMENTING ATOMICITY OF MEMORY OPERATIONS IN DYNAMIC MULTI-STREAMING PROCESSORS

CROSS REFERENCE TO RELATED DOCUMENTS

The present application is a continuation of patent application Ser. No. 09/592,106, filed Jun. 12, 2000, which is a continuation-in-part (CIP) of prior U.S. Pat. Nos. 6,477,562, 6,292,888, 6,389,449 and pending patent application Ser. No. 09/312,302 filed May 14, 1999, all of which are incorporated herein in their entirety by reference.

FIELD OF THE INVENTION

The present invention is in the area of computer system memory operations, and pertains more particularly to memory operations performed by dynamic multi-streaming (DMS) processors.

BACKGROUND OF THE INVENTION

Multi-streaming processors capable of processing multiple threads are known in the art, and have been the subject of considerable research and development. The present invention takes notice of the prior work in this field, and builds upon that work, bringing new and non-obvious improvements in apparatus and methods to the art. The inventors have provided with this patent application an Information Disclosure Statement listing a number of published papers in the technical field of multi-streaming processors, which together provide additional background and context for the several aspects of the present invention disclosed herein.

For purposes of definition, this specification regards a stream in reference to a processing system as a hardware capability of the processor for supporting and processing an instruction thread. A thread is the actual software running within a stream. For example, a multi-streaming processor implemented as a CPU for operating a desktop computer may simultaneously process threads from two or more applications, such as a word processing program and an object-oriented drawing program. As another example, a multi-streaming-capable processor may operate a machine without regular human direction, such as a router in a packet switched network. In a router, for example, there may be one or more threads for processing and forwarding data packets on the network, another for quality-of-service (QoS) negotiation with other routers and servers connected to the network and another for maintaining routing tables and the like. The maximum capability of any multi-streaming processor to process multiple concurrent threads remains fixed at the number of hardware streams the processor supports.

A multi-streaming processor operating a single thread runs as a single-stream processor with unused streams idle. For purposes of discussion, a stream is considered an active stream at all times the stream supports a thread, and otherwise inactive. As in various related cases listed under the cross-reference section, and in papers provided by IDS, which were included with at least one of the cross-referenced applications, superscalar processors are also known in the art. This term refers to processors that have multiples of one or more types of functional units, and an ability to issue concurrent instructions to multiple functional units. Most central processing units (CPUs) built today have more than a single functional unit of each type, and are thus superscalar processors by this definition. Some have many such units, including, for example, multiple floating point units, integer units, logic units, load/store units and so forth. Multi-streaming superscalar processors are known in the art as well.

The inventors have determined that there is a neglected field in the architecture for all types of multi-streaming processors, including, but not limited to the types described above: The neglected field is that of communications between concurrent streams and types of control that one active stream may assert on another stream, whether active or not, so that the activity of multiple concurrent threads may be coordinated, and so that activities such as access to functional units may be dynamically shared to meet diverse needs in processing. A particular area of neglect is in mapping and handling of external and internal interrupts in the presence of multiple streams and also exception handling.

A dynamic multi-streaming (DMS) processor known to the inventors has multiple streams for processing multiple threads, and an instruction scheduler including a priority record of priority codes for one or more of the streams. The priority codes determine in some embodiments relative access to resources as well as which stream has access at any point in time. In other embodiments priorities are determined dynamically and altered on-the-fly, which may be done by various criteria, such as on-chip processing statistics, by executing one or more priority algorithms, by input from off-chip, according to stream loading, or by combinations of these and other methods. In one embodiment a special code is used for disabling a stream, and streams may be enabled and disabled dynamically by various methods, such as by on-chip events, processing statistics, input from off-chip, and by processor interrupts. Some specific applications are taught, including for IP-routers and digital signal processors.

The DMS processor described above is further enhanced with a processing system that has an instruction processor (IP), register files for storing data to be processed by the IP, such as a thread context, and a register transfer unit (RTU) connected to the register files and to the IP. Register files may assume different states, readable and settable by both the RTU and the IP. The IP and the RTU assume control of register files and perform their functions partially in response to states for the register files, and in releasing register files after processing, set the states. The processing system used by the DMS processor is particularly applicable to multi-streaming processors, wherein more register files than streams may be implemented, allowing for at least one idle register file in which to accomplish background loading and unloading of data.

A further enhancement to the above-described DMS processor utilizes unique inter-stream control mechanisms whereby any stream may effect the operation of any other stream. In various embodiments the inter-stream control mechanisms include mechanisms for accomplishing one or more of enabling or disabling another stream, putting another stream into a sleep mode or awakening another stream from a sleep mode, setting priorities for another stream relative to access to functional resources, and granting or blocking access by another stream to functional resources. A Master Mode is taught in this enhancement, wherein one stream is granted master status, and thereby, may exert any and all available control mechanisms relative to other streams without interference by any stream. Supervisory modes are taught as well, wherein control may be granted from minimal to full control, with compliance of controlled streams, which may alter or withdraw control privileges. Various mechanisms are disclosed, including a mechanism wherein master status and inter-stream control hierarchy is recorded and amended by at least one on-chip bit map. In this mechanism each stream maintains and edits a bitmap granting or withdrawing control privileges for each other stream, the settings valid for any stream but a Master stream, which will ignore the settings.

Yet another feature taught in disclosure related to the DMS processor described above relates to interrupt handling. Interrupt handler logic is provided wherein the logic detects and maps interrupts and exceptions to one or more specific streams. In some embodiments one interrupt or exception may be mapped to two or more streams, and in others two or more interrupts or exceptions may be mapped to one stream. Mapping may be static and determined at processor design, programmable, with data stored and amendable, or conditional and dynamic, the interrupt logic executing an algorithm sensitive to variables to determine the mapping. Interrupts may be external interrupts generated by devices external to the processor software (internal) interrupts generated by active streams, or conditional, based on variables. After interrupts are acknowledged streams to which interrupts or exceptions are mapped are vectored to appropriate service routines. In a synchronous method no vectoring occurs until all streams to which an interrupt is mapped acknowledge the interrupt.

The present invention provides apparatus and methods for implementing atomicity of memory operations in systems wherein two or more processing streams share one memory resource. The present invention relates more specifically to such systems utilizing DMS processors as known to the inventors and as described above and in other disclosure in the present document. Atomicity in this context means that each participating stream is able to perform a read-modify-write operation that has the effect of an indivisible operation with respect to all participating streams.

It is well-known in the art of data processing that in many cases, a sequence of memory read and write functions may not be atomic with respect to other processors. This typically can occur when two processors are accessing the same memory location at the same time. Without mechanisms to guarantee atomicity, two separate processors programmed to increment the same location in memory may read and write their values for that location with only one increment taken. For example, assume that a value in a memory location is 4 and the incremental value is 1. A single read, increment, and write sequence by one single-stream processor would result in a value of 5. If two processors increment at separate times, then the value would be 6 reflecting two increment operations, which would be the correct result. If however, both processors attempt to increment at the same time, the value may only be incremented one time leaving a value of 5 in memory, which is not the desired result.

The well-known MIPS architecture, as well as other known architectures, provide methods to assure against the undesired result in the example described above of two or more processors attempting to increment a memory location at the same time. MIPS, for example, provides a mechanism in which a sequence of operations containing a Load Linked instruction and a Store Conditional instruction will either be atomic or will fail with an indication of failure being provided. Any modification of the memory location between the Load Linked and the Store Conditional instructions will cause the Store Conditional to fail without modifying memory. Another attempt will then be made to repeat the entire sequence.

In a DMS processor, it is desired that when two streams are attempting to atomically read and modify a memory location, processor resources are not utilized to repeatedly loop until the entire read-modify-write sequence can be completed successfully.

What is clearly needed is a new method and apparatus that guarantees atomicity while addressing the inefficiency problems described above with regard to DMS processors sharing a single memory resource. Such a method and apparatus would allow for atomicity of memory operations and at the same time provide an opportunity to further optimize processing speed of DMS processors by preventing unnecessary and repetitive use of on-chip resources.

SUMMARY OF THE INVENTION

In a preferred embodiment of the present invention a multi-streaming processor is provided comprising a plurality of streams for streaming one or more instruction threads; a set of functional resources for processing instructions from streams; and a lock mechanism for locking selected memory locations shared by streams of the processor, the hardware-lock mechanism operating to set a lock when an atomic memory sequence is started and to clear a lock when an atomic memory sequence is completed. In preferred embodiments the lock mechanism comprises one or more storage locations associated with each stream of the processor, each storage location enabled to store a memory address a lock bit, and a stall bit.

In processors according to preferred embodiments of the invention, as a stream begins an atomic memory sequence, the targeted memory address is written into the storage location associated with that stream and the lock bit is set, a search of all other storage locations associated with streams is made, and if a memory address match is found with the lock bit set for the matched storage location, the stream sets the stall bit and the stream stalls until the stall bit is cleared. Also, upon a stream performing an atomic sequence storing the modified result of the sequence to the memory location accessed, the lock bit is cleared in the associated storage location for that stream and all stall bits are cleared in memory locations associated with streams in the locking mechanism, allowing another stream to begin an atomic sequence. Further, as a stream begins an atomic memory sequence, the targeted memory address is written into the storage location associated with that stream and the lock bit is set, a search of all other storage locations associated with streams is made, and if a memory address match is not found with the lock bit set for the matched storage location, the stream continues the atomic sequence.

In preferred embodiments the lock mechanism is implemented comprising hardware installed into the multi-streaming processor during manufacturing. In other embodiments the lock mechanism may be implemented comprising firmware or software. Also in some embodiments the storage locations may be reserved memory locations in a memory shared by the streams within which the processor performs atomic memory sequences.

In another aspect of the invention a method for implementing atomic memory sequences on a multi-streaming processor is provided, comprising the steps of (a) associating a storage location with each of the streams of the multi-streaming processor, including a lock bit and a stall bit; (b) upon starting an atomic memory sequence by a stream, writing the memory address to be modified in the sequence into the associated storage location, and setting the lock bit; (c) searching all storage locations associated with other streams for memory addresses stored therein, and state of lock bits; (d) upon finding no match to the memory address having also a set lock bit, continuing the atomic sequence to completion; and (e) upon finding a match to the memory address with a set lock bit, setting the stall bit for the stream, and stalling operation for the stream until the stall bit is cleared.

In preferred embodiments there is a further step (f) for clearing all stall bits for streams having matching memory address stored in their storage locations upon completion of a store operation at the end of the atomic sequence, thereby allowing another stream to continue with an atomic operation.

In some embodiments the storage locations are hardware registers implemented on the multi-streaming processor memory address is located in on-chip memory of the multi-streaming processor. In others the storage locations are reserved locations in the same memory upon which the multi-streaming processor performs atomic memory sequences.

In embodiments of the invention disclosed in enabling detail below, for the first time a system for DMS processors id provided wherein synchronous memory operations may be performed entirely atomically, without unnecessary operations by competing streams.

BRIEF DESCRIPTION OF THE DRAWINGS FIGURES

FIG. 1B is an exemplary bitmap illustrating control authorization data according to an embodiment of the present invention FIG. 1C illustrates resource assignment for streams according to an embodiment of the present invention.

FIG. 1D illustrates priorities for a stream according to an embodiment of the present invention.

FIG. 1E illustrates control indicators for one stream according to an embodiment of the present invention.

FIG. 8 is a data table illustrating a hardware lock mechanism according to an embodiment of the present invention.

DESCRIPTION OF THE PREFERRED EMBODIMENTS

Figure 1A:
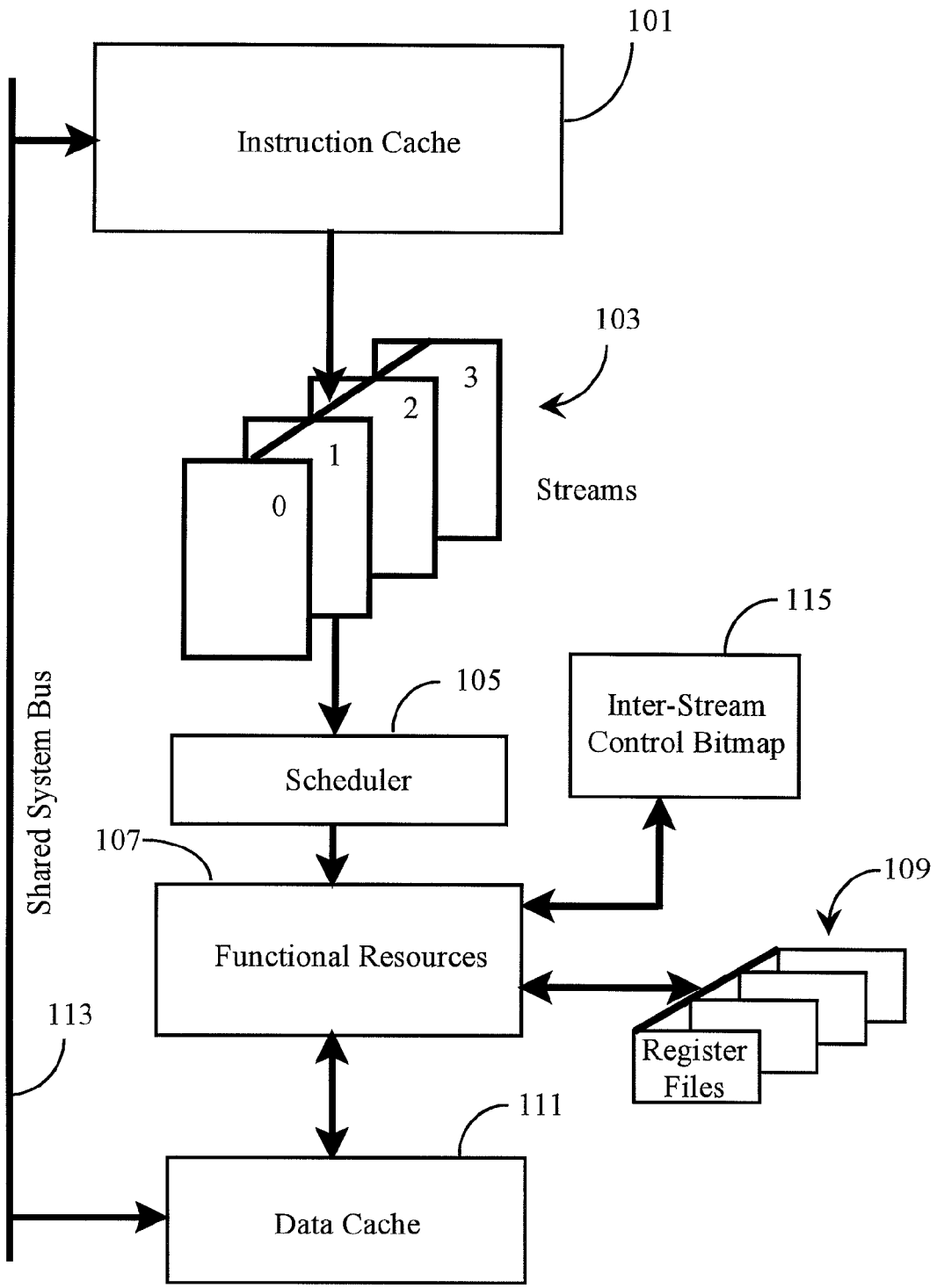
FIG. 1A is a generalized diagram of a multi-streaming processor according to an embodiment of the present invention.

Multiple active streams operating in the same processor are often related by the nature of the threads supported. Advantages may be gained, therefore, if a thread running in one stream (an active stream) is enabled to initiate and/or control functions of one or more other active streams. Active streams may share work on the same task and may therefore need efficient methods of passing data. One active stream may temporarily require exclusive use of certain processing resources or of total throughput. Such an active stream needs a way of asserting its particular claims, while allowing other active streams to continue operating as efficiently as possible with fewer resources. These are issues in all multi-streaming processors. In this concept and the descriptions that follow, it is well to remember again that by an active stream is a stream that is running a particular thread, and also that a thread context is associated with an active stream by a register file.

Multi-streaming processors, as described in priority document Ser. No. 09/216,017, have physical stream resources for concurrently executing two or more instruction threads, and multiple register files as well. The present invention applies to all such processors and also to processors that may accomplish multi-streaming in other ways. In various embodiments of the present invention a set of editable characteristics is kept for active streams, and these characteristics regulate the forms of control that may be exercised by other active streams over that particular stream. These editable characteristics may take any one of several forms in different embodiments, by convenience or for special reasons.

In preferred embodiments the editable characteristics are implemented in silicon on the processor chip, as this arrangement allows very quick access in operation. The invention, however, is not thus limited, and such characteristics may be stored and editable in other ways. The editable characteristics may also be mapped as stream-specific or context-specific in different situations and embodiments.

In one exemplary embodiment a bit-map is maintained wherein individual bits or binary values of bit combinations are associated with individual streams and assigned particular meaning relative to inter-stream communication and control, indicating such things as supervisory hierarchy among streams at any particular time, access of each stream to processor resources, and state control for Master Stream, Enable and Disable modes, and Sleep modes, which are described in further detail below.

In the bit-map described above, some supervisory control bits regulate the forms of control that any other active stream may exercise over each individual active stream. Active streams may, within carefully defined limits, set and reset their own control bits, and other active streams with appropriate permission may also do so. A master thread, at any point in time, may run in a stream, which is then designated a Master Stream while running a Master Thread, and a Master Stream has complete control over slave streams, and may at any time override the control bits of the slave streams. If there is more than one Master stream running, each may have different designated slave streams. With appropriate control settings, active streams may act as supervisors of other active streams, temporarily (typically) controlling their execution and communicating with them. Further, a Master Stream has, and supervisor streams may have, control over what processing resources active slave streams may use, either directly or by modifying a stream's priorities.

FIG. 1A is a generalized diagram of a multi-streaming processor according to an embodiment of the present invention, showing an instruction cache 101 providing instructions from multiple threads to four streams 103, labeled 0 -3, from which an instruction scheduler dispatches instructions from active streams to functional resources 107. A set of multiple register files 109, in this case four, but may be more, is shown for use in processing, such as for storing thread contexts to be associated with active streams during processing. Data flows to and from register files and a data cache 111, and the functional resources may include a Register Transfer Unit (RTU) as taught in priority document Ser. No. 09/240,012 incorporated herein by reference.

In this embodiment a unique inter-stream control bit-map 115 stores individual bits, and in some cases binary values of bit combinations, associated with individual streams and assigned particular meaning relative to inter-stream communication and control, as introduced above. A shared system bus 113 connects the instruction and data caches. The diagram shown is exemplary and general, and the skilled artisan will recognize there are a number of variations which may be made. The importance for the present purpose is in the multiplicity of streams adapted to support a multiplicity of threads simultaneously.

It was described above that Inter-stream control bitmap 115 is a reference repository of control settings defining and configuring Inter-stream control. In this reference single bits in some instances, and binary values represented by two or more bits in other instances, define such things as priorities of an active stream for shared system resources, fixed resource assignment to particular streams, and control hierarchy among active streams. Specific control characteristics in one exemplary embodiment are described below.

In one aspect of control in this embodiment of the present invention, an active stream is enabled to set and edit control reference data unique to that stream. In another aspect one stream may alter the control reference data for other streams. In the latter aspect each particular stream may control which other streams may edit which control data for the particular stream.

FIG. 1B is a portion of bit map 115 of FIG. 1A, showing bits set to indicate state of authorization granted by one stream, in this case stream 0, for other streams to alter control bits associated uniquely with stream 0, or to exercise specific control functions relative to stream 0. A similar bit map in this embodiment exists for each of streams 1, 2, and 3, but one instance is sufficient for this description. In this matrix there is a row for each of streams 1, 2, and 3, and columns for control definition. Again, these bits may be set by active stream 0, and the motivation for editing the bit map will be related to the function of stream 0, which will be defined by the nature of the thread running in stream 0. The bit map, however, is a physical resource associated with a stream in a multi-streaming processor, and exists to enable several forms and degrees of inter-stream control and cooperation.

The first column from the left in FIG. 1B is labeled supervisory, and indicates supervisory authorization. Logical 1 in the row for streams 1 and 2 indicates that stream 0 grants supervisory access to streams 1 and 2, but not to stream 3. Supervisory access means that these other streams may edit the control data for the instant stream. With the setting shown, then, the inter-stream control data for stream 0 may be edited by streams 0 (itself) and also by streams 1 and 2, but not by stream 3. Because each active stream may edit its own control data, the authorization for streams 1 and 2 may be rescinded at any time, and re-authorized at any time, by active stream 0.

An example of a situation wherein stream 0 might grant access to one or more streams to edit its own control data configuration would be in the case that stream 0 is running a very low priority thread, or is not running a thread at all, and is simply available for a new thread.

The second column in FIG. 1B is labeled enable. Stream 0 uses a bit in this column to grant permission for another stream to enable stream 0 if stream 0 is disabled. In the instant case there are no logical 1's in this column, so none of streams 1, 2 or 3 may enable stream 0. There is a distinct difference between the authorization for supervisory editing access described above relative to the first column of FIG. 1B, and authorization for such as enable or disable. In the first case, permission is granted for another stream to set the control data for the instant stream, reconfiguring the control hierarchy between streams in a broad aspect. In the second instance no access to control data is granted to another stream, but another stream is granted permission to exercise a specific form of control, such as enable or disable for the instant stream. The next bit column to the right of enable is disable, and the exemplary setting indicates that streams 1 and 3 are at the moment granted permission to disable stream 0.

The next bit column is labeled priorities, and a logical 1 in this column for a stream indicates that stream 0 grants another stream permission to set priorities for stream 0. In the instant case stream 0 does not allow any other stream to set its priorities. Priorities are typically set in embodiments of the invention to indicate access to processor resources. The next bit column is labeled interrupts, and means that another stream may interrupt stream 0. In the instant case stream 2 is granted the interrupt privilege.

It should be clear to the skilled artisan, given the teachings of this specification, that there are a variety of revisions that might be made in the matrix shown, and the meaning of specific columns. It should also be clear that the matrix illustration is exemplary, and the bits described could as well be individual bits in a two-byte register, as long as the convention is kept as to which bits relate to which streams and to which control functions and resources.

In preferred embodiments of the present invention inter-stream control is described for multi-streaming, super-scalar processors, meaning processors that have multiple streams and also multiple functional resources. Such a processor may have, for example, several integer processing units, several floating point processing units, several branch units, and so on. The inter-stream control configuration indicated by bit-map 115 (FIG. 1A) may be set in embodiments of the invention to reserve certain resources to certain streams, and restrict those same resources from use by other streams.

FIG. 1C is a bit row indicating instant resource assignment for stream 0. Again, similar resource assignment configuration may exist for all other streams as well, but one should be sufficient for illustration. In this case there are 4 integer units, 4 floating point units, and 4 branch units. The instant setting shows that stream 0 has reserved access to integer units 1, 2, and 3, and to branch unit 1. Conversely, this setting means stream 0 may not access integer 4, any floating point unit, or branch units 1, 2, or 3. Because stream 0 as an active stream may set its own configuration, including granting and denying control bit setting to other streams, stream 0 (or any active stream) may reserve, in specific instances, specific resources. Again it will apparent to the skilled artisan that the structure illustrated is exemplary, and the could be varied in a number of ways.

In some cases, rather than relying on a fixed assignment and division of resources in a superscalar processor, better results may be obtained by assigning resources by priority to streams, or by a mixture of assignment for some resources and priority management for others. By fixed assignment is simply meant that for a period of time, as shown in FIG. 1C, resources may be distributed exclusively, but the distribution may, of course, be edited (altered) by each active stream at any time for its own assignments, or, in cases where authorization is granted, by another active stream.

FIG. 1D illustrates a portion of bitmap 115 of FIG. 1A devoted to priority settings for stream 0. In this case, priorities may vary from zero to seven, so three bits are needed for each priority level setting, with the binary value of the bits indicating priority level. There are in one embodiment three different sorts of priorities, which may be termed execution priority, interrupt priority and resource priority. All three types of priority are illustrated in some form in FIG. 1D, although there may be more or less granularity than illustrated.

In FIG. 1D the top row indicates execution priority. This setting determines for a stream what threads may execute in that stream. That is, a thread may have inherently a certain priority or be assigned a priority, and the execution priority as shown in FIG. 1D may be edited by a stream or for a stream by a supervisor active stream. Only a thread with a priority higher than the stream's execution priority may execute in that stream. The concept of a thread having a priority may be implemented in different ways. In some preferred embodiments a thread has a priority by virtue of a thread context which has an assigned and alterable priority. That is, when a context is loaded to a register file, that context may be assigned a priority number of pre-designed or determined granularity, and the thread that is (or will be) called to a stream when the context is made active and associated with a stream may then be said to have the priority of the context stored in the register file. In some cases, as will be made more clear in description to follow, contexts may be stored in memory other than in a register file, and be retrieved at a later time to a register file for initial or further processing. The stored context may carry the priority level of the context as well.

The second row from the top in FIG. 1D indicates interrupt priority for stream 0. The interrupt priority shown is three, which means that only an interrupt with a priority level of three or higher may interrupt stream 0. Again, the stream itself when active with a thread or an active supervisor stream may edit the interrupt priority level.

The lower three rows of the priority level settings for stream 0 in FIG. 1D, labeled integer, floating point, and branch, indicate priority levels for stream 0 for access to types of processor resources. It will be apparent to the skilled artisan that these three do not constitute all types of processor resources, and there may therefore be more rows for the resource priorities in some embodiments.

At the point in time illustrated stream 0 has a seven (highest) priority for integer units, a priority level of four for floating point units, and a priority level of three for branch units. These settings are exemplary, and there may well be, in alternative embodiments, priorities maintained for other processor resources. In various embodiments of the invention temporarily fixed resource assignments may be used exclusively, in others priority may be used exclusively, and in still others, a mixture of the two. Resource priority means that in a case of contention for a resource, the active stream with the highest priority will claim the resource.

In this embodiment of the invention other control bits are used to indicate control hierarchy and state. FIG. 1E indicates such control bits for stream 0. In this example, the control bits for stream 0 in FIG. 1E indicate that stream 0 is, at the instant in time, running a Master thread, and is enabled, but is not in sleep mode. These bits are indicative, and are primarily for reference for other active streams in operation. For example, if one active stream disables another, in the process the acting stream sets the enable/disable bit for the subservient stream. If an active stream puts itself in sleep mode, it sets its sleep bit before going to the sleep mode, so active streams may know, by checking the control bits, that that stream is in sleep mode. The control that one active stream may exert on another is accomplished in some instances by setting bits in the control configuration, such as by editing the resource allocation and/or priorities for another stream, and in other instances in other ways, such as through issuing a software interrupt, starting a new thread in an inactive stream, and so on.

A Master stream is a Master stream by virtue of running a Master thread, and an active Master stream has complete access and control over other streams, which are slave streams to the Master. It is not necessary that any stream grant the Master stream permission to edit control configuration. A Master stream may have a variety of duties, one of which, in preferred embodiments, is initial setup of a multi-streaming processor. On startup and reset in a system utilizing a processor according to an embodiment of this invention, a Master stream will typically be called at some point in the boot process, and will act for example to set initial priorities for streams, to set supervisory bits, and to start specific threads in specific streams. These duties can and will vary from system to system, as, in some cases some default settings may be made by executing specialized BIOS code, and a Master thread may be called for further setup duties, and so on.

After startup a Master thread need not typically remain executing in a stream of the processor. The Master stream, having accomplished its ends, may set another thread to start in the stream it occupies, then retire, or may simply retire, leaving an inactive stream available for use by another active stream to execute such as an interrupt service routine, a utility function of another sort, and the like. A Master thread may be recalled after retiring for a number of reasons. For example, a contention for resources may require the Master for resolution, or an interrupt or exception may require the Master stream for resolution. It will also be apparent to the skilled artisan that the Master stream in some systems may be running the Operating System or a portion thereof, or a routine loaded and active with a system BIOS, and the like. In some systems according to embodiments of the invention, all inter-stream control functions may be disabled, allowing the processor to run just as a processor without the control capabilities taught herein.

In some embodiments there may be certain fixed functionality. For example, a processor according to the invention may be hard-wired to make one stream always the Master stream, and no other. By hard-wired is meant that certain functionality is preset by the hardware resources implemented in silicon devices and their connections. Specific assignments of other threads to specific streams may also be set. In such cases, specific resource priorities and/or assignments may also be set, or any other of the inter-stream functionalities taught herein. Such pre-setting will be highly desirable for highly dedicated system applications, such as, for example, network routers and the like.

It will be apparent to the skilled artisan, following the teaching herein, that there will be a number of ways that control data may be represented, stored, and accessed. The illustrations provided herein are exemplary. In a preferred embodiment the control data map is implemented in silicon devices directly on the processor chip. This arrangement is preferred because, among other things, access to the control data is fast. In some embodiments, however, a control bitmap may be in any accessible memory device in a system, such as in an otherwise unused portion of RAM, or even on such as a flash card memory.

The concept and existence of a Master thread in a system according to an embodiment of the present invention has been discussed above. All other threads are slaves to a Master thread, so all active streams other than one Master stream are slave streams to the Master. There are, however, other levels of control other than Master and slave. Specific streams may be granted supervisory control, and be expected to exercise supervision responsibilities over other streams, as may be inferred from the teaching above. The state of supervisory bits in the embodiments of the present invention described above reflects the granularity of supervisory control.

It was described above that a Master thread may pursue such ends as initial setup and loading of threads into streams, and may return to resolve conflicts and exceptions. Just as in any other processor system, however, the overall system function is to execute one or more applications. In a general-purpose computer there may be many applications, and the uses of the computer are similarly many. One may browse the Internet, send and receive e-mails, make drawings, process photographs, compose word documents, and much more. Typically each application is dedicated to particular functions, and application threads, as applications are called, occupy one or more of the streams of the processor.

In more dedicated systems, such as, for example, a data router in a packet data network, there are relatively fewer applications, and the functions of the machine are typically ordered in some fashion other than user-initiated. In a data router, for example, the functions may be called according to characteristics of data received to be processed and forwarded.

In one aspect of the invention software is specifically enhanced to take maximum advantage of the new and unique control functions of a multi-streaming processor according to embodiments of the invention, although this is not required in all embodiments. Also, some software executing on a processor may be enhanced according to embodiments of this invention, and other software may not. Typically, there will be at least an operating system or Master thread, or both, with specific code to cooperate with the new control and status functions built into a multi-streaming processor according to embodiments of the invention.

Given the control data resources and functions described above with reference to FIGS. 1A through 1E, there are a wide variety of configurations that might be implemented, all the way from completely fair, with all streams being equal, to highly dedicated, with many functions preset and not variable. For example, in some processors according to the present invention one stream, say stream 0, may be always the Master stream by design. Since the Master stream has complete access to all processor resources, and may manipulate control data for all the other streams, while no other stream may change control functions for the Master stream, the data bits and values shown for streams in FIGS. 1B through 1E, and described above, would not need to be implemented for the dedicated Master stream.

Given the descriptions and exemplary architecture described above, there are a broad variety of inter-stream communications and control functions that may now be performed that were not available prior to the present invention. For example, any one active stream may manipulate its own resource allocation and priority according to its needs, which will relate closely to the nature of the thread running in the stream, and the nature of other threads available to run or actually running in other streams. Also an active stream may start, enable, disable, interrupt, branch and join other streams with prior knowledge of possible repercussions, because each active stream may check the control data settings for other streams. The enormous advantage provided is an ability to maximize real-time efficiency rather than simply use of processor resources. That is, system goals may now be addressed. Processors have historically been designed to maximize processor resources, in an often incorrect assumption that to do so necessarily addresses system goals as well. It is easy to understand, however, that a multi-streaming processor may be fully engaged efficiently accomplishing low-priority tasks, while higher priority tasks receive inadequate attention, and therefore does not adequately address system goals.

In embodiments of the present invention one active stream, running a thread (application) that may need or be enhanced by another thread running in parallel, may call the subservient thread and start it an available stream. An example is a WEB browser accessing a WEB page having an MPEG video clip. The browser, running in one stream of a processor according to an embodiment of the present invention may call an MPEG player to run in an available stream. The state of the data control bits and values will guide the browser stream in selecting a stream for the MPEG player. The browser may not, for example, co-opt an active stream running a thread having a higher priority. It may, however, co-opt a stream that has set its control data bits that it may at any time be interrupted.

Operation in this embodiment can be illustrated by following a sequence of operations to accomplish a typical task, such as forking a new thread. Threads can fork other threads to run in different streams. For example an operating system may wish to fork an application program, or an application may need to fork a sub-task or thread. A thread encountering an exception may fork a process to handle it.

Figure 2A:
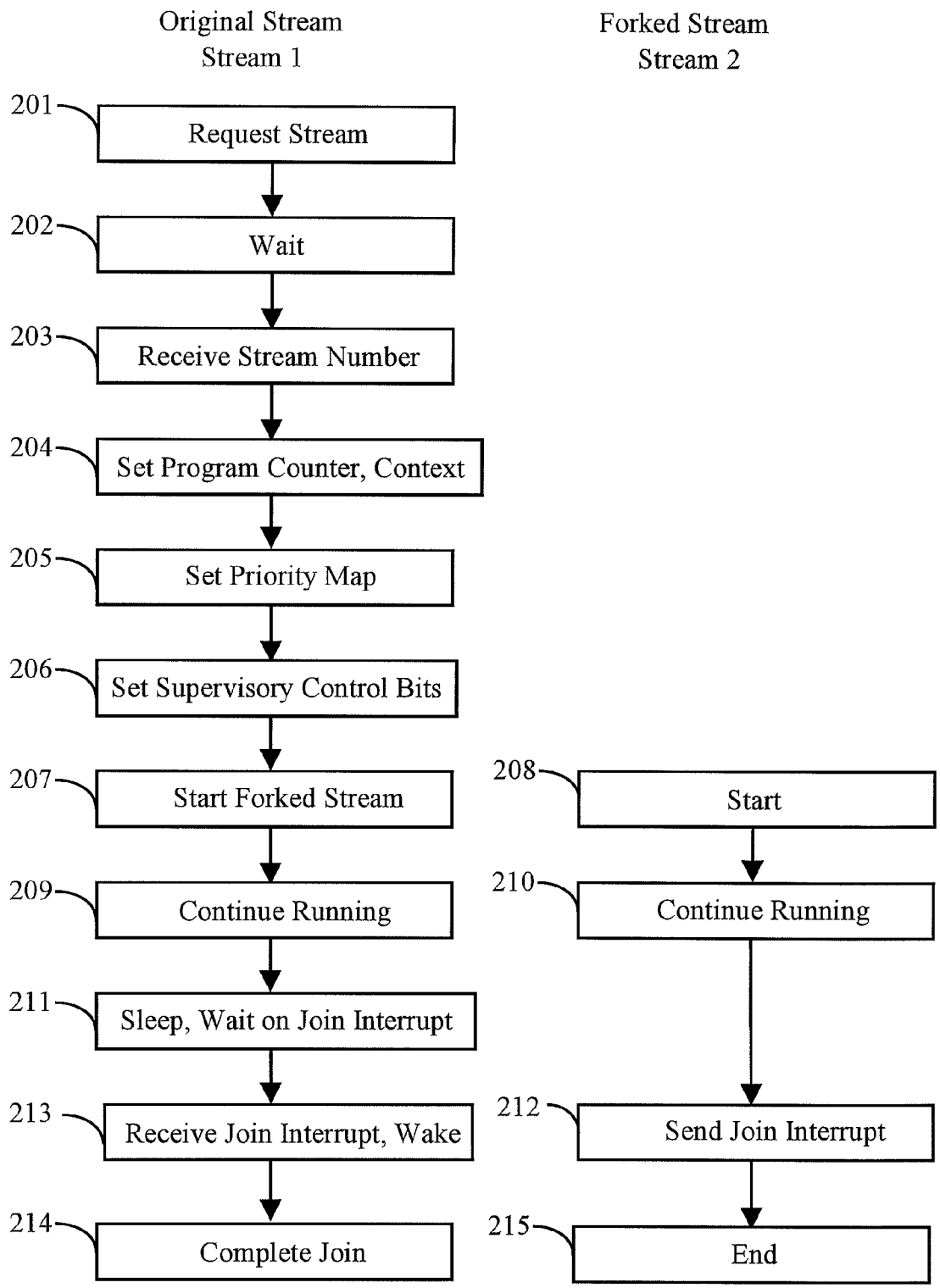
FIG. 2A is a flow chart illustrating one method whereby a thread in one stream forks a thread in another stream and later joins it.

A preferred method in an embodiment of the invention for fork and join operations is shown in FIG. 2A. Assume that the thread in stream 1 of FIG. 1A is forking a new thread. To do so, stream 1 as the supervisor thread requests an idle stream to use in step 201 and waits until such a stream is available in step 202. In most cases there will be no wait. Stream 1 receives the number of an available stream, for example stream 2 in step 203. In some circumstances there will need be a wait limit, after which, with no stream becoming available, alternate action is taken. For the present example, however, it is assumed that a stream is immediately available or becomes available in a reasonable interval.

To initialize stream 2 to run the new thread, active stream 1 loads the assigned stream's program counter with the address of the first instruction in the new thread and loads other components of the new thread's context into appropriate elements of processor resources in step 204 and sets the priority map for stream 2 in step 205. Stream 1 may also set supervisory control bits 107 for stream 2 in step 206. (Alternatively, the new thread, running in stream 2, may set the bits after step 208.) Stream 2 must have its supervisory control bits set to allow the supervisor thread to act as its supervisor and the supervisory control bits of the supervisor must be set to allow the controlled thread to interrupt it. When these initializing steps are done, the supervising thread starts the new thread in stream 2 in step 207. Alternatively, stream 2 may be put in sleep mode, waiting on an internal or external event. The new thread starts running in stream 2 in step 208. In steps 209 and 210 both streams run independently and concurrently until a join is required. In this example, it is assumed that the thread running in stream 1 finishes first.

When the supervisor thread needs to join the forked thread, it checks first to see if the forked thread is still running. If so, it executes an instruction at step 211 that puts itself to sleep, setting the sleep bit in stream control bits 118, and then waits for a join software interrupt from the forked thread. The forked thread sends a join interrupt in step 212 and the supervisor thread receives the interrupt and wakes in step 213. The supervisor completes the join operation in step 214. Finally the forked thread ends in step 215, freeing its stream for use by another thread.

Figure 2B:
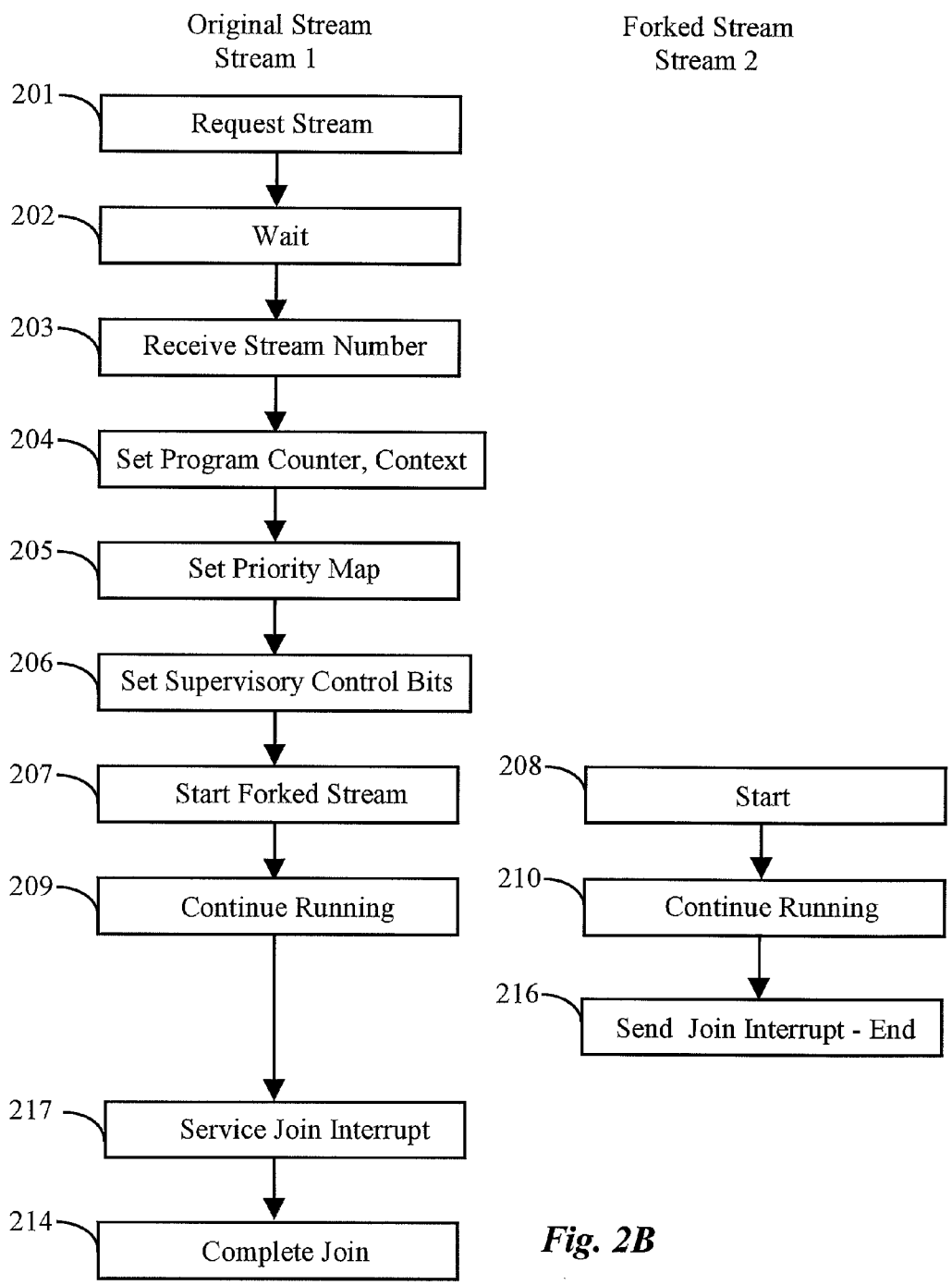
FIG. 2B is a flow chart illustrating another method whereby a thread in one stream forks a thread in another stream and later joins it.

FIG. 2B illustrates the companion case wherein the forked stream finishes before the supervisor stream. In this case, when the forked stream finishes, it immediately sends the join interrupt (step 216). The interrupt remains on hold until the supervisor stream finishes, then the interrupt is serviced in step 217 and the join is completed. If registers can be loaded and stored in the background as described in co-pending priority application filed Jan. 27, 1999, entitled "Register Transfer Unit for Electronic Processor," then the process of forking a new thread for which the context is not already loaded is modified from the steps shown in FIG. 2 as shown in FIG. 3.

Figure 3:
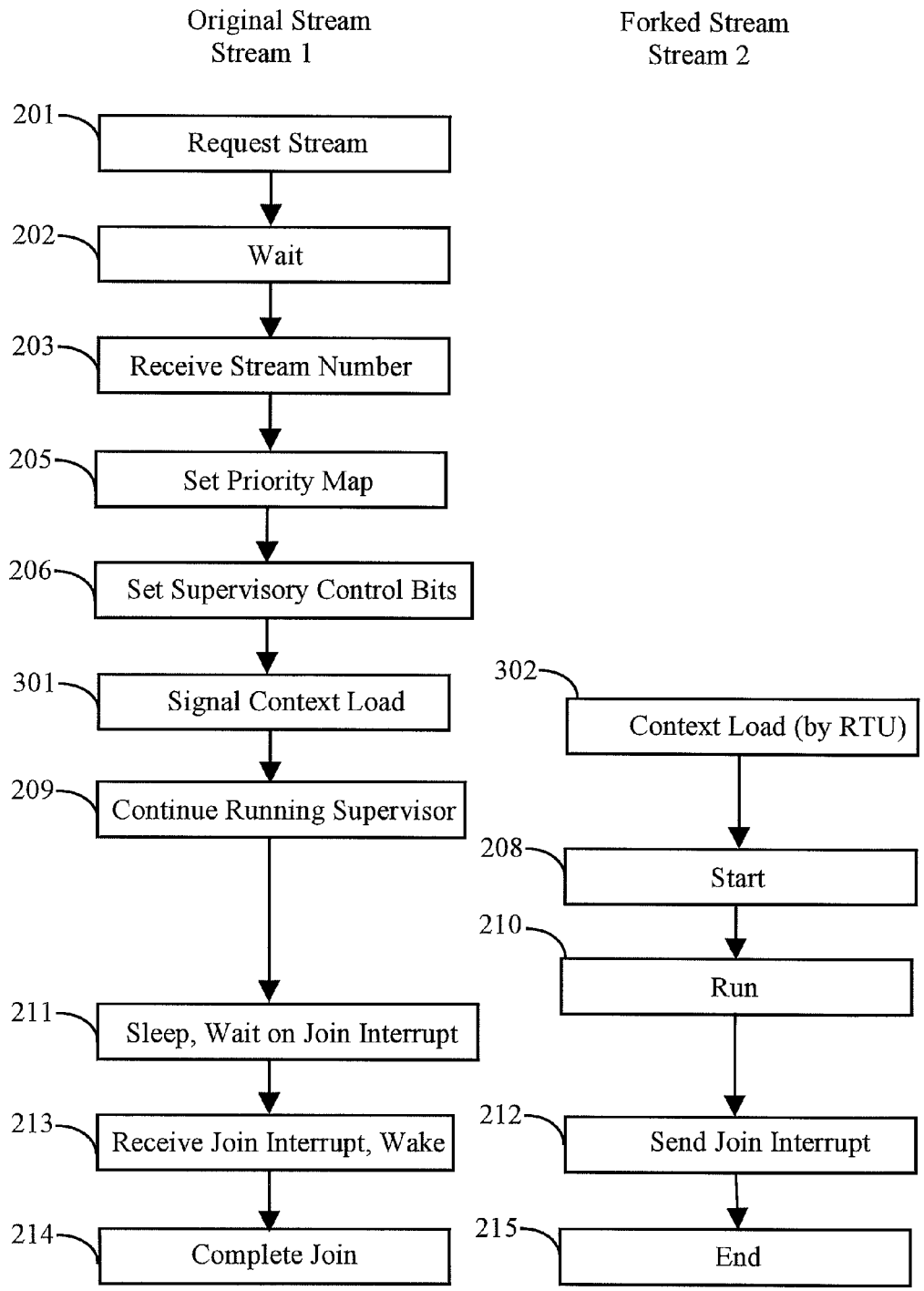
FIG. 3 is a flow chart illustrating a method whereby a stream in one stream forks a thread in another stream in a processor containing a special register transfer.

As shown in FIG. 3, the steps are identical to those in FIGS. 2A and 2B, except step 204 for setting program counter and context is eliminated. After step 206, in new step 301, the supervisor signals the register transfer unit (RTU) to load the context for the new stream. When these operations are complete, the supervisor can continue with other operations in step 209.

The RTU does the context switch in step 302. When the RTU is done loading the new stream's context, it can make the freshly loaded register file active and start the new stream in step 208, again, independently of the supervisor stream. Step 207 of FIG. 2 is thus eliminated. The remaining steps are identical to FIG. 2A, assuming the supervisor finishes first. Otherwise the same as FIG. 2B. As in FIG. 2 of the co-pending application, the register file previously used by stream 2 will be saved. The embodiments described above are exemplary of many embodiments that may be implemented within the scope of the present invention. Those skilled in the art will recognize that the powerful architectural concepts taught for the first time herein may be applied to many types of processors, including but not limited to single-chip systems, microprocessors, controllers, routers, digital signal processors (DSPs), routing switches and other network devices, and processors designed for other special uses. The teachings of this invention may be practiced in conjunction with processors of any size, from simple one-chip complete systems to complex supercomputer processors. The invention may be realized in simple and highly dedicated form for small systems or in complex, sophisticated form for large systems. By defining and enabling master and supervisor streams to control the utilization of resources of slave streams, a processor can be dynamically configured to meet the requirements of particular software and software mixes, to meet strict timing requirements for example. Streams can, for example, be guaranteed a certain percentage of overall processor throughput, or a percentage utilization of particular resources or classes of resources. Thus the new architecture allows balancing the optimization of the execution of particular threads along with efficient use of processing resources.

As a further example of the use of priorities, consider a router for use in a packet-data network embodying a processor according to FIG. 1A. Each stream in the router processor, except for a control program running as the master in stream 0, processes a separate flow of packets of three different types. Each of the three slave streams are processing packets using different protocols that have different service guarantees related to the timely forwarding of packets. Assume that for the particular protocols and classes of service being processed, access to integer units will have a great impact on meeting service guarantees. Accordingly, the master sets the priority map of stream 1, which has the highest service guarantee, to the value 6, giving it priority access to integer units higher than the other streams (except the master). Stream 3, with the next most strict service guarantee, has a lower priority, 5, and stream 2 the lowest priority, 3. After initially setting priorities, the Master monitors throughput for each protocol and insures that service guarantees are being met, modifying priorities further as needed. Thus the supervisor can dynamically allocate resources to streams based on the current needs of the threads, modifying priorities as needed to meet service guarantees of a wide variety of protocols and classes of service. Because service guarantees are met using supervisory software and not hardware, the router can be easily upgraded as new requirements evolve.

Another example of the use of priorities may also be illustrated by a data router system. Consider such a system having four streams, wherein one or more threads are available to streams for processing data packets. Assume that contexts have been loaded to register files and associated with streams to start a thread in each of the four streams to process arriving data packets.

As is known in the art of data routers not all data packets need equal processing. Some packets need only be forwarded as received. Others may need to be restructured into a different format. Still others will need to be, for example encrypted/decrypted. The type of packet dictating the work flow to process the packet is typically contained in a header for the packet, and the type and scope for processing can only be known to the processor after a thread context is loaded to a register file, the register file is associated with a stream (active stream) and processing is commenced on a data packet.

In a preferred embodiment of the present invention, as was illustrated in FIG. 1D and described above, each stream is said to have an execution priority, meaning that only a process with higher priority may run in that stream. In one aspect the execution priority for each stream of a processor is maintained as three editable bits in a portion of bit map 115 of FIG. 1A. In the exemplary data router case, as packets arrive to be processed, the context for the packet is loaded to a register file. This may be done in preferred embodiments by a Register Transfer Unit (RTU) according to the teachings of priority document Ser. No. 09/240,012.

As described immediately above, it is necessary to commence processing of a data packet before the nature of the packet may be known. Therefore, as packets arrive and register files are loaded, each context is given an initial high priority. For example, on a scale of seven, each initial context will be assigned a priority of six.

Now, as streams become available, register files are associated with streams, according to priority of the register files and the execution priority of the streams. Associating a register file with a stream starts the context thread in the stream, constituting an active stream. The stream's execution priority is now set to the high priority (in this example, six) of the context that was loaded. As processing of the newly-loaded packet begins, it may be determined that the packet is indeed a fast packet, and the high priority is indeed appropriate, in which case the processing will continue to completion. In the present invention, at the completion of processing of a packet it is desired that the next context started in the stream be the highest-priority-level waiting context. This is done in this example by selectively lowering the execution priority until a context loads, or the execution priority is zero. The only way zero will be reached is if there is no waiting context of any priority. In this situation the stream will remain idle until any context becomes available.

In this example, if the execution priority is six at the end of processing a packet, the execution level is reset to five, then four, and so on, which assures that the next context loaded will be the waiting context with the highest priority level.

As processing commences, however, it may be determined that the packet is of a type that deserves an intermediate priority. The thread running in the stream then lowers the execution priority to perhaps four. If there are no waiting contexts higher than priority four, the active stream continues to process the data packet to completion, and follows the example described above, wherein, upon completion the stream will set its execution priority to three, then two, and so on until a new context loads. If, however, a new packet has arrived, since new contexts are given an initial priority of six, the arrival of the new packet will force a context switch, causing the stream to cease operations on the slower packet, and to commence processing instead the new, higher-priority data packet, resetting the execution priority of the stream to six.

If the context switch ensues, the saved context still has a priority of four, and will await opportunity for re-assignment to a stream for further processing, typically under control of the RTU, as described above. There is, of course, no guarantee that any newly arrived data packet is a faster packet, but there is a certain probability that this is so. If the new packet is a faster packet, then system goals are enhanced. If not, then the active stream, now at priority level six again may again lower its own execution priority to potentially delay execution of the newly loaded packet, and seek again a faster packet to process. The new packet, for example, may be a very slow packet, requiring decryption. The active stream may then lower the execution priority to two, and again force a context switch if a new packet has arrived for processing, in which case a context will be saved with a two priority for the slow packet, which will than wait for processing opportunity by virtue of priority. If a stream is running at an execution priority of two, no new packet (six) arrives, but there is a waiting context with a four priority, the four context will pre-empt the stream with the two execution priority, and so on.

In this manner, packets may be processed with priority according to type, even though the type cannot be known until the context is loaded and processing has commenced on each newly-arriving data packet, providing a new way for system goals to be met in data routing applications, while also ensuring processor efficiency.

Many other useful functions are consistent with the invention's teachings regarding interstream control and communication. In a simple two-stream controller for a dedicated application, for example, with a fixed master/supervisor and a fixed slave stream, a single supervisory control bit for the slave stream could give the master stream a useful type of resource control, such as allowing access to a floating point unit, while allowing the slave to suspend such control during critical periods using the supervisory control bit.

The types of control that one stream may have over other streams through the mechanisms of supervisory control bits and stream control bits are not limited. A single type of control or a large number of controls may be appropriate, depending on the purpose of the system. Additional controls could regulate the sharing of global registers or global memory, memory protection, interrupt priorities, access to interrupt masks or access to a map between interrupts or exceptions and streams, for example. In a processor with one or more low power modes, access to power control may also be regulated through additional supervisory control bits and stream control bits or such control may be reserved exclusively for a stream that is running the master thread.

The type of control that one stream may have over another stream's resources can also take many forms. In one of the simplest forms, a simple two-stream controller, for example, to be used in a dedicated application, with a fixed master/supervisor and a fixed slave stream, a single stream control bit for the slave stream could give the master stream the ability to disable the slave during instruction sequences when the master needs full use of all resources.

Priorities and scheduling of any form described in priority document Ser. No. 09/216,017 may be implemented in combination with the new teachings of the present invention. If such priorities are not implemented, then a stream could exert a simpler form of control by directly blocking another stream's access to one or more resources temporarily. In this case the supervisory control bits representing priorities would be replaced with bits representing resource control. Priority maps would be replaced with one or more control bits used to temporarily deny access to one or more resources or classes or resource. For example, if one stream needs exclusive use of a floating point unit, it can be made a supervisor of the other streams, and set resource control bits denying access to the floating point unit in each of the other streams while it needs exclusive access. If another partially blocked stream encountered a floating point instruction, the instruction scheduler would suspend execution of the instruction until the floating point resource control bit for that stream were reset by a supervisor stream.

Interrupts and Exception Handling in Multi-streaming Processors

The area of interrupts and exceptions has been but briefly described in the aggregate disclosure above. It will be appreciated by the skilled artisan, however, that the existence of multiple streams, with all of the many new degrees of freedom and versatility introduced thereby, creates a considerable complexity where interrupts and exceptions are concerned. The inventors have determined that there is a significantly neglected field in the architecture for all types of multi-streaming processors, including but not limited to the types described above: the flexible and orderly handling of interrupts by individual streams, as a general method for accommodating devices external to the processor, exceptions, and inter-stream communications. Accordingly the present inventors have further provided unique and powerful apparatus and methods for extending functionality through interrupt and exception coordination and mapping. These new techniques are presented below in enabling detail.

In Embodiments of the Present Invention Related to Interrupts and Exceptions the Inventors Recognize Several Types:

External—the interrupt is generated by a device external to the processor, such as a printer interface, modem or other I/O device.

Internal—special instructions are executed by the processor that intentionally generate interrupts for purposes such as quickly calling a section of code or communicating between threads. Such interrupts are also known as software interrupts.

Exception—a special "exceptional" event occurs during processing, caused by execution of an instruction or a hardware error. For example, an instruction may attempt to divide a number by zero, a return stack may overflow or an attempt to fetch from memory may generate a memory parity error.

In the realm of software interrupts, in the context of multi-stream processors, in embodiments of the present invention a thread executing in one stream can interrupt another stream. In descriptions herein it will be said that one (active) stream interrupts another stream, which may or may not be active. This mechanism is used in embodiments of the invention to initiate processing of special events or at specific places in a code sequence. In some instances an active stream can use this inter-stream interrupt capability to gain control of the processor, pre-empting and stopping execution of threads in other streams. In another example, an inter-stream interrupt may be used by one stream to request some task be done by another stream to improve performance or response.

As an example of an internal, stream-to-stream interrupt, one can imagine an application program (thread) running in one stream, wherein the application has repeated and frequent need for executing another thread or task. Typically such a process in the prior art would be accomplished by calling the task, performing a context switch, processing the task, then performing another context switch to return to the original thread. In embodiments of the present invention, having dedicated registers for each stream, the main application can be mapped to one stream and the other task to another, with the first stream interrupting the second when the task is needed, avoiding considerable processor overhead.

The skilled artisan will understand that this is but one of many examples of inter-stream interrupts. The methods and hardware constructs needed to accomplish such mapping and inter-stream activity is described in more detail below.

In an extension of the mechanism of inter-stream interrupts, in embodiments of the present invention an active stream may pass off exception processing to another stream. In this process the stream encountering an exception interrupts the stream mapped for exception processing, and waits until the exception-processing stream finishes before continuing with its own processing. This unique capability is especially important for real-time systems so the overhead of changing contexts may be avoided. Structured exception handling could then also be implemented in hardware.

External Interrupts

Figure 4:
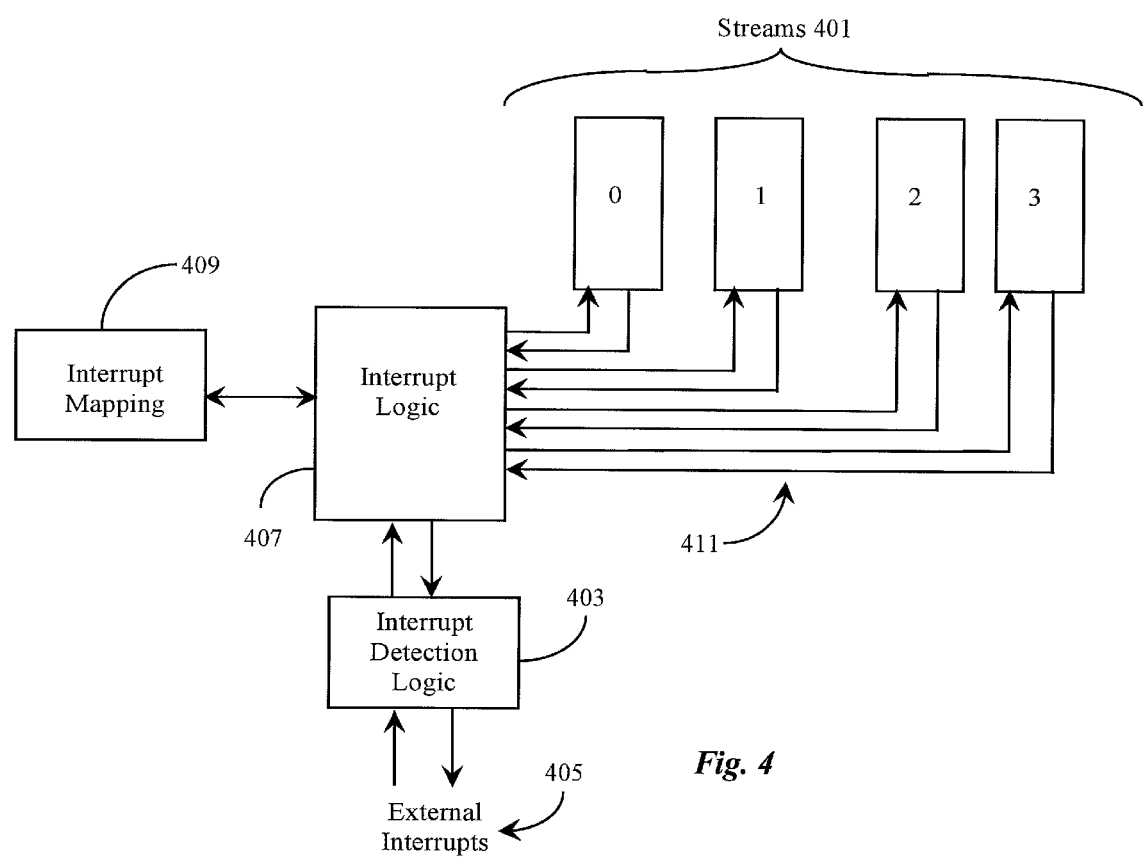
FIG. 4 is an architecture diagram illustrating interrupt mapping and processing in an embodiment of the present invention.

FIG. 4 is an architecture diagram illustrating general interrupt mapping and processing in an embodiment of the present invention. In this diagram streams 401 labeled 0, 1, 2 and 3, are the same four streams as streams 103 in FIG. 1A. For external interrupts the processor includes interrupt detection logic 403 for detecting external interrupts 405 generated by devices external to the processor. The interrupt detection logic communicates with interrupt logic 407. Logic 407 in some embodiments communicates with interrupt mapping data 409, which may in some embodiments be a part of control map 115 of FIG. 1A, but may also in some embodiments be a separate entity on or off the processor. The interrupt logic interrupts individual streams, and individual streams respond (acknowledge) by logic paths 411.

For an external interrupt, as described briefly above, the interrupt (405) is generated by a source external to the processor, and is detected in a multi-stream processor according to embodiments of the present invention by Interrupt Detection Logic 403. This detection can be done in any of several ways. The external devices may, for example, exert each a dedicated interrupt line having an input pin to the processor, and the detection can be on leading or trailing edge of a voltage change, for example. Other means of interrupt issuance are known to the inventors.

Once an external interrupt is detected, logic 403 communicates the receipt of the interrupt to Logic 407. It is the task of Logic 407 in this embodiment to process the interrupt according to one of several possible mechanisms, new in the art for multi-streaming processors. Specifically, Interrupt Logic 407 receives the interrupt and decides which stream or streams to interrupt depending on the type of interrupt and on one or any combination of the following mechanisms:

Static mapping—Interrupts are mapped to specific streams and this mapping is fixed and unchangeable. Example— three types of interrupts and two streams. Type one interrupt is mapped to stream two and type two interrupt is mapped to stream one, with type three interrupts mapped to both stream one and two. In a preferred embodiment static mapping of this sort is accomplished by specific logic devices in logic 407 (hard-wired), and is fixed at design time.

Programmable mapping—Interrupts are mapped to specific streams by programming bit-maps or data storage. In this variation there may be a an Interrupt Map 409, and Interrupt Logic 407 refers to this map for each interrupt received to determine which stream or streams to interrupt. This mapping is generally done at boot-up time or by the operating system, and is fixed prior to the interrupt occurring. Once an interrupt is detected, this mapping is consulted and appropriate streams are interrupted. Example: assume three types of interrupts and two streams. Type one interrupt may be mapped to stream two and type two to stream one, with type three mapped to both stream one and two. At a later point in time, when the streams are running different threads, types one and two are both mapped to stream one and type three is mapped to both streams one and two. The map (409) in this case will have been altered by software such as the operating system to change the mapping.

Dynamic or conditional mapping—In this case interrupts are mapped to specific streams by using logic which is made aware of the state of the machine at the point in time the interrupt occurs and creates the mapping based on that fact and also on any other parameter, for example the type of interrupt. Mapping is created dynamically every time an interrupt occurs. For dynamic mapping there may be an algorithm to process (firmware or software routine), or logic may have bits and registers settable to alter the result of an interrupt communicated to Logic 407. Example—The interrupt-mapping algorithm could map interrupts to the stream that is inactive or if no inactive stream exists to the stream running the lowest priority thread.

Once Logic 407 determines the mapping, streams are interrupted on logical paths 411. The skilled artisan will recognize there are several ways the interrupt may be issued to a stream once the determination is made. Once an interrupt is issued to a stream or streams, the streams have to acknowledge that they are ready to execute an interrupt service routine. (Vectoring to an interrupt service routine is a process well-known in the art to those with ordinary skill. This acknowledgement can occur at different times for different streams. Any delay may be due to code currently executing on the stream, or the stream may temporarily mask the interrupt. The interrupt, however, will remain pending as long as the external source exerts the interrupt. Interrupt detection logic 403 will control this behavior. If multiple streams are required to acknowledge the interrupt, the interrupt logic will wait till all of them have acknowledged before sending an external acknowledgement. This behavior can be modified as necessary, i.e. the external acknowledgement can happen after only one stream has recognized the interrupt or in any other combination.

As each stream acknowledges an interrupt, the interrupt logic sends the appropriate service vector to the stream. This vector may be the same or different for each of the streams. Depending upon the vector that the stream receives, the associated interrupt service routine will be loaded into the stream to begin executing. Hence different streams could have different responses or behavior for the same interrupt. Example—an audio device may interrupt two streams, one of which vectors to the interrupt service routine to store the audio data to a hard disk drive. The other stream may vector to an audio playback routine, and direct the audio data directly to speakers.

After each stream that is interrupted finishes its interrupt service routine it will normally return back to whatever thread it was running before the interrupt occurred. Again different streams can take different amounts of time to go back.

Internal Interrupts

Internal interrupts, as briefly described above, are generally software interrupts that are used by programs to request specific functionality from the operating system or to execute sub-routines. These interrupts in embodiments of the present invention are managed to behave with the degrees of functionality described above for external interrupts. Software interrupts issued by active streams are processed by logic 407, and the interrupt logic can handle these interrupts and map them according to the three types as described above. Another variation on the mapping is the special case wherein an interrupt is only mapped to the stream executing the soft-interrupt. The rest of the steps will be as above.

Synchronized Interrupts

Synchronized interrupts are variations on the above cases, i.e. both internal and external interrupts. Synchronized interrupts behave differently in the vectoring stage. In the case of synchronized interrupts the interrupt logic will not vector the streams to execute interrupt service routines until it has received acknowledgements from all the streams to which the interrupt is mapped. This behavior is to require a synchronized start of response to an interrupt. For example, consider a debugging interrupt, i.e. a breakpoint set on a thread executing on one of the streams. The debugger may want to view the state of the system at a stable point, i.e. at the point where all the streams have stopped executing whatever thread they were executing. Hence the interrupt logic will generate the interrupt to all of the streams, but will wait till they all have generated acknowledgements before vectoring them to the debugger service routine. However, even though the logic waits for all the streams to catch up, the streams that acknowledge are stopped from further execution.

Exceptions

Exceptions are generated by code running in the streams and generally indicate error conditions. Exceptions are always synchronous to executing code, i.e. the stream generating the exception will always do so at the same point. There may, however, be many different responses to exceptions.

Self-response. This is the same as in a standard non multi-streaming processor. Here the stream generating the exception stops whatever it is doing and vectors to the exception handling routine and starts executing code from there. When the exception handler routine finishes, it will normally return to the point in the original code where the exception took place and the original thread will continue execution.

Blocking send to another stream—Here the stream generating the exception will stop execution of the current thread, but will not acknowledge the exception itself. The exception instead is broadcast to all other streams. Whichever stream is programmed or mapped to acknowledge the exception will do so and start execution of the exception handler routine. If no stream acknowledges the exception, then the Master thread will be sent the exception. If the master thread is already executing, it will now vector to the exception handler. If it is not running, it will be made active and allocated to a stream for execution, and then it will handle the exception. The Master thread is always capable of acknowledging any exception, if no other thread will. This way structured exception handling can be implemented in hardware. Once the exception routine returns, the original stream is notified and can then start its execution again. This method is implemented mainly for the reason that all streams may not have access to all the hardware resources needed to process a certain exception, and hence the stream that is incapable has to pass the exception to one that is capable.

Non-blocking send to another stream—This method is similar to the one above, but the original stream that generates the exception is not blocked. It generates the exception and then continues executing. Exception handling is guaranteed to complete by another stream or the master thread. This method is generally used for non-fatal exceptions like overflow. As and example consider the overflow exception—the stream generating the overflow sets a flag to indicate that it generated the exception and continues to execute. Another stream can acknowledge the exception and update a counter to count the number of times a particular value overflowed.

Any exception can be mapped to any of the above three categories. This mapping can again be done using the same techniques as for the interrupts. Exceptions can also be synchronized, in that an exception handler may not be executed until all the streams that that exception is mapped to have stopped executing and acknowledge the exception.

Implementation of the mechanisms described above, involving software and hardware interrupts and exception handling relative to multi-stream processors, may in some instances (programmable mapping) be accomplished partly through an alterable control file. Referring to FIG. 1A, an inter-stream control bitmap 115 was described wherein state of single bits and bit values of multiple bits are associated with specific streams and functions, such as enabling, disabling and priorities. In some embodiments of interrupt and exception mapping and handling this bitmap is extended to the functions described herein relative to interrupt and exception handling and mapping. As previously described, bitmap 115 may be implemented on the multi-stream processor chip as hardware in a manner that the bit values may be altered by active streams. In other embodiments a file in local memory may be used for mapping interrupts and interrupt and exception parameters. In embodiments using portions of such a bit map for mapping, single bits or bit values for multiple bits may be used to map streams to interrupts and exceptions much as enabling, disabling, priorities and the like are mapped in description above relative to FIGS. 1B through 1E.

It will be apparent to the skilled artisan that there are many alterations that may be made in the embodiments described above within the spirit and scope of the present invention. For example, there are many ways the supervisory characteristics and relationships between streams may be recorded and amended, beyond the examples provided. There is similarly a broad range in granularity in control that may be exercised, and so on.

Thread Synchronization

As described in the background section, the MIPS architecture or other known conventions may be used to implement atomicity when a processor attempts to perform an atomic read-modify-write operation on a single value in memory, such as to increment a counter.

In embodiments of the present invention methods are provided for implementing atomicity of memory operations by separate streams executing in DMS processors.

Figure 5:
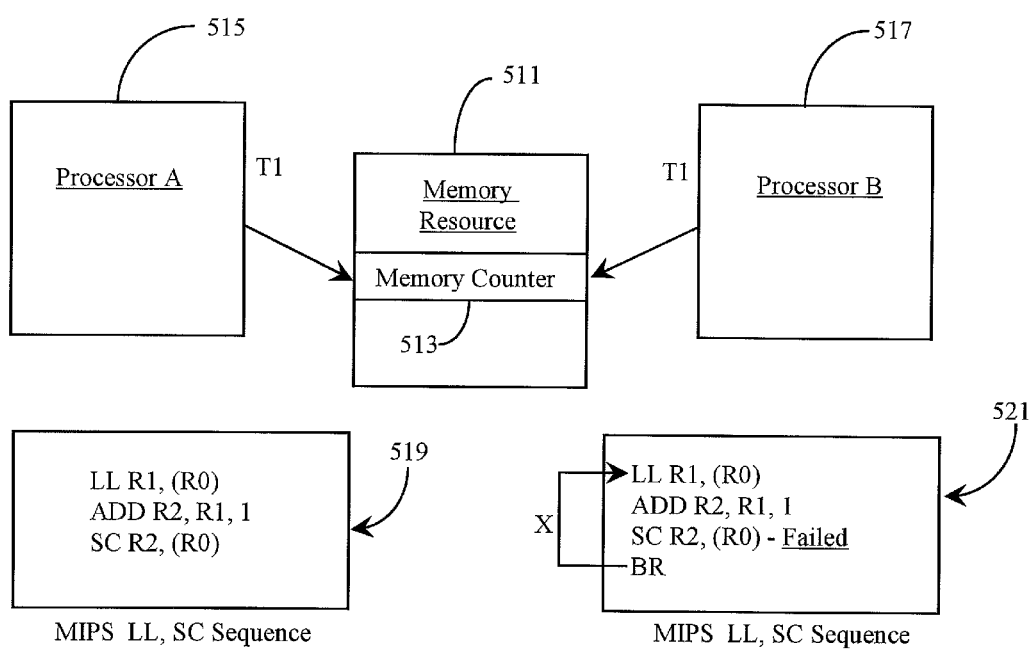
FIG. 5 is a block diagram illustrating two processors attempting to increment a single location in a shared memory wherein atomicity is implemented by MIPS architecture according to prior art.

FIG. 5 is a diagram illustrating a prior-art solution in which atomicity is implemented according to the usage of conventional MIPS instructions. FIG. 5 shows two single streaming processors, processor 515 (Processor A) and processor 517 (Processor B), each incrementing the same memory location 513 in a shared memory 511.

Memory location 513, in this example, stores a value for a memory counter and hereinafter will be referred to as counter 513. Also in FIG. 5, a series of MIPS instructions are illustrated for incrementing counter 513. Without an implementation of atomicity, the problem that could occur would be, for example, if processor 515 were to read the value of counter 513 and proceed to increment the value, while processor 517 reads the same counter value before the first processor stores a new value. In this case, there may only one increment of the counter.

The MIPS architecture has a standard way of dealing with this situation. The conventional method known in the art makes use of the Load Linked and Store Conditional instructions. Following the sequential MIPS instructions in the example illustrated by FIG. 5, assume that processor 515 and processor 517 are both attempting to increment counter 513 as illustrated in blocks 519 and 521. One with skill in the art of the MIPS architecture will recognize the functionality intended by each of the lines of instructions illustrated in blocks 519 and 521.

As illustrated, processor 517 may read counter 513 and may also increment the value stored in counter 513, but may not store the result because processor 515 was first to store its incremented value. Following the Load Linked, Store Conditional sequence for processor 517, which is represented within block 521, notice the branch instruction after the Store Conditional instruction. Because processor 515 was first to write counter 513, it writes successfully as illustrated in block 519. This condition exists as long as no other processor writes to the counter before processor 515. Processor 517, attempting to write the same counter 513, after processor 515 has written its value, will fail to store, as illustrated by the included word failed after the store instruction in block 521. The branch (BR) instruction, illustrated herein as the fourth line in block 521, forces processor 517 to return to the Load Linked instruction (first line), re-execute, and reload the counter value. The net effect of the Load Linked, Store Conditional instruction sequence in MIPS and other instruction sets, is that in all cases, if two different processors attempt to increment counter 513, the counter will be correctly incremented twice.

A problem with the Load Linked, Store Conditional instruction sequence is that a second processor (517) following the above example, performs instruction sequences that are unnecessary utilizing processor resources. This is not a large problem where single streaming processors are concerned because the second processor would simply have to wait until the first processor finishes. There is a situation of interest to the present inventors, however, in which the standard operation of the Load Linked, Store Conditional instructions could be a serious problem if streams within a DMS processor were substituted for Processor A and Processor B in FIG. 5.

Figure 6:
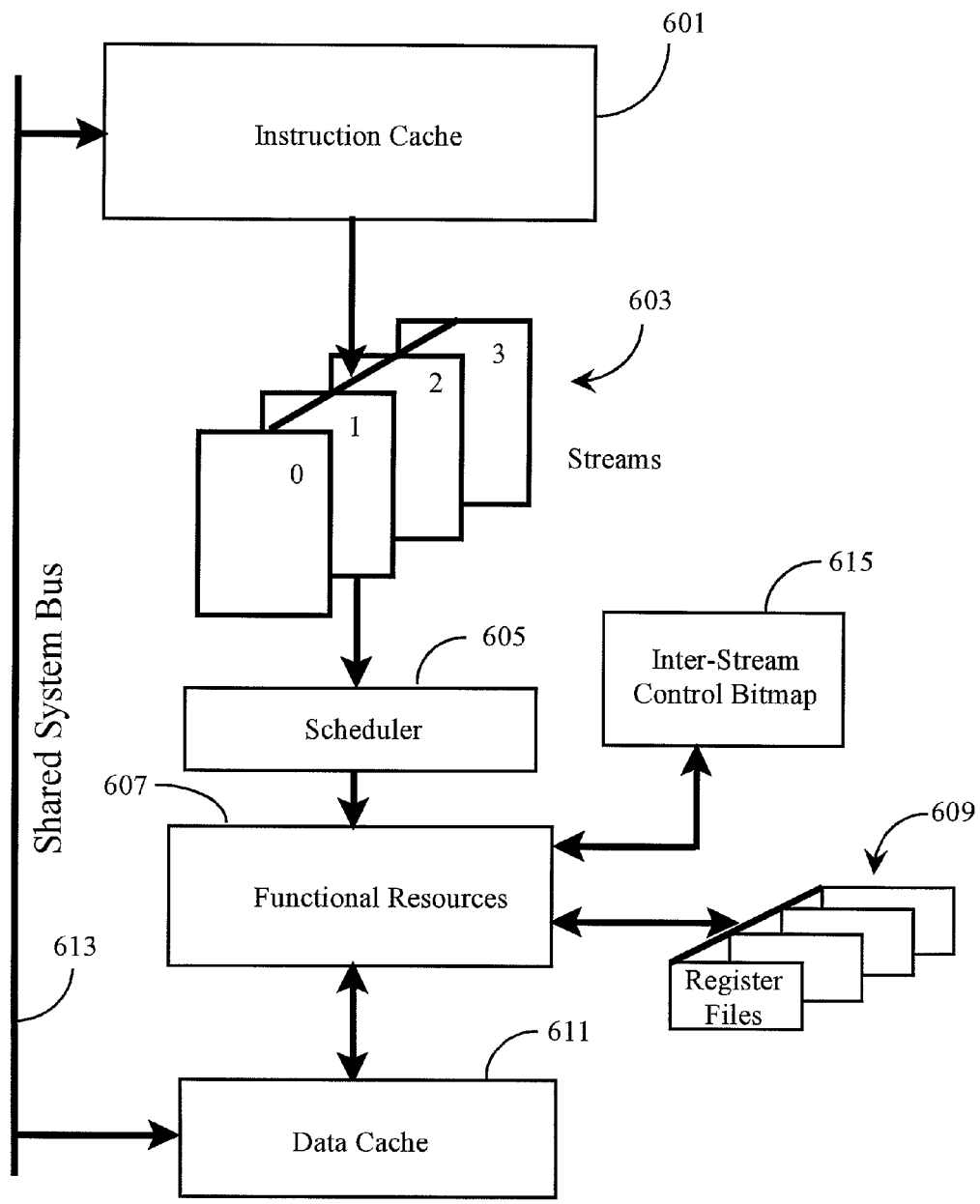
FIG. 6 is a block diagram illustrating components and interconnectivity of a DMS processor as known to the inventors and as used in accordance with the present invention.

FIG. 6 is a diagram illustrating basic elements and operations in a DMS processor. In such a processor, known to the inventors, instructions are fetched typically from instruction cache 601 to a plurality of operating streams 603. In a DMS processor, each stream is a hardware facility capable of executing a software thread. A scheduler 605 maps execution for the streams to functional resources of the processor. In this DMS processor there are multiple register files 609 provided for use in executing the multiple streams, such that each operating stream may have an associated register file. In one embodiment of this unique processor the number of register files exceeds in the number of streams so context switches may be made without interrupting stream operations.

Scheduler 605 grants access to functional resources 607. In some embodiments access to resources may be granted to streams according to various priority states as described in the background section. An inter-stream control bitmap 615 in some embodiments is provided to enable streams 0-3 to micro-manage one another during operation. In this example of a DMS processor multiple streams may attempt to read and increment or otherwise alter the same memory location in data cache 611, at the same time, or in close time proximity. This situation may lead to difficulty in the same way that two or more individual processors reading and attempting to modify contents at the same memory location may lead to incorrect results. If a conventional MIPS instruction sequence (LL-SC) is used to implement atomicity, then one or more of the multiple streams attempting to perform atomic read-modify-write sequences may repeatedly branch back to a re-execution sequence thereby utilizing processor resources unnecessarily as was described in the example of FIG. 5. In this case, as opposed to the case of separate processors, however, repeated looping by one or more streams can affect processor efficiency.

To implement atomicity and efficiency in this situation, the inventors provide a unique method for locking a memory location until the atomic read-modify-write sequence is finished and has stored the result of its execution back to the memory location.

Figure 7:
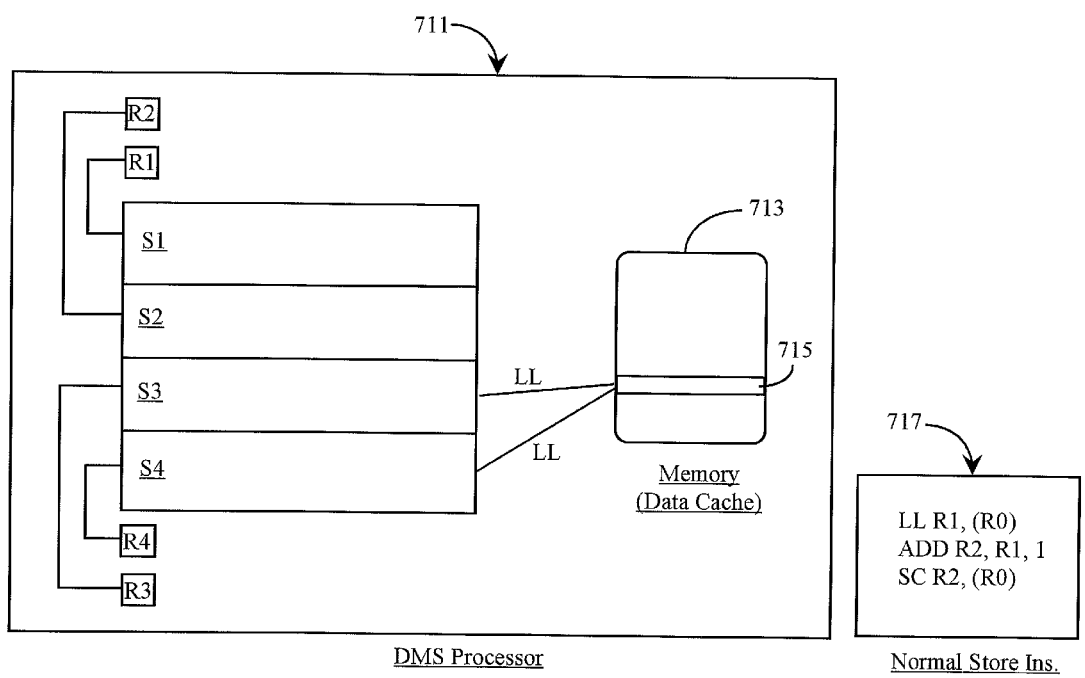
FIG. 7 is a block diagram illustrating a single DMS processor having two or more streams attempting to increment the same memory location according to an embodiment of the present invention.

FIG. 7 is a block diagram illustrating a single DMS processor 711 having four streams (S1-S4) with two streams operating in a mode accessing memory resource 713 and enhanced with a hardware lock feature according to an embodiment of the present invention.

Within DMS processor according to an embodiment of the present invention, a stream executing an instruction meant to initiate an atomic sequence relative to a particular memory location creates a lock on that memory location which is released upon the execution of the write-back instruction finishing the atomic sequence. The instruction sequence may be the MIPS Load Linked, Store Conditional instruction. Multi-threaded code running within the DMS processor could guarantee atomicity without using the Store Conditional instruction, such as by using a normal Store Word instruction. However for compatibility with multiprocessor MIPS implementations, it is expected that most software would continue to use the Store Conditional instruction.

Referring again to FIG. 7, if S3 is the stream that first executes a LL instruction to address 715, stream S3 will cause that memory location to lock as described above. The entire atomic read-modify-write operation relative to S3 can be written:

| L1: | LL  | T1, (T0)   |
|-----|-----|------------|
|     | ADD | T2, T1, 1  |
|     | SC  | T2, (T0)   |
|     | BEQ | T2, 0, L1  |
|     | NOP |            |

Due to the hardware lock mechanism, the Store Conditional instruction will always succeed, except in the case of an interrupt or a TLB entry replacement, which would both be rare. If another stream attempts to increment the same memory location using the same sequence of instructions, it will stall until the first stream completes its atomic sequence.

Interrupts need not be disabled for a stream that is within an atomic sequence, nor for a stream that is stalled. If a stream is currently stalled on the execution of a LL instruction, an interrupt may be taken, clearing the lock bit and the stall bit and with the EPC pointing to the LL instruction (so lo it will be executed again when the interrupt service routine returns).

The memory lock within a DMS processor in embodiments of the present invention is accomplished in a preferred embodiment through the use of one register added to the DMS processor for each of the streams of the processor. The register for each stream is used to store a memory address as needed for each of the running streams. There is further a lock bit, which indicates that the memory address is locked, and a stall bit, which indicates that the associated stream is stalled. These registers and extra bits are illustrated in FIG. 8, which shows the hardware arrangement for the four-stream DMS processor of the present example (see FIG. 6). There may be more than four streams and more than four associated registers in preferred embodiments.

In embodiments of the present invention, when a LL instruction (for example) is executed by a stream, the associated address register is updated for that stream and the lock bit is set. In addition, a search of all other LL address registers is made. If an address match is found, and the lock bit is set, indicating another stream has started an atomic read-modify-write sequence for the same memory location, the first stream will set its stall bit and will stall.

When a stream performs a store operation, the lock bit for that stream is cleared. Whenever a lock bit is cleared, the stall bit for any stream stalled on that memory address is also cleared, which allows the LL instruction (for example) for the stalled stream to be completed for that stream. In this case the LL instruction will be re-executed and its result will be placed in the register destination specified.

When a Store Conditional instruction (for example) is executed, if the associated lock bit is not set, the SC instruction will fail and no store to the memory location will take place. This would normally only happen if the TLB entry for the memory location had been replaced, if an interrupt had been taken, if an exception had taken place or if there was another memory instruction between the LL and the SC. Properly designed software should implement atomic read-modify-write sequences such that there are no memory operations between the LL and the SC instructions and that no exceptions can occur.

If multiple streams are stalled on the same memory location, the LL instructions will all be scheduled for re-execution when the lock bit for the stream that is not stalled is cleared. If multiple LL instructions are dispatched in the same cycle, and the memory addresses match, and if no LL address registers match, one will stall and the others will proceed. If a LL instruction and a store instruction are dispatched in the same cycle to the same address, and assuming there is no stall condition, the LL instruction will get the old contents of the memory location and the store will overwrite the memory location with new data.

Using the hardware technique described above, atomicity is implemented with respect to read-modify-write sequences by different streams of a DMS processor, as well as a degree of optimization by virtue of elimination of unnecessary resource utilization.

Siesta Instruction

In a situation in a DMS processor wherein a memory location just needs to updated atomically, for example to increment a counter as illustrated above, the entire operation can be implemented with a single LL/SC sequence. In that case the DMS processor will stall a second stream wanting to increment the counter until the first thread has completed its store.

This stall will be very short and no CPU cycles are wasted on reloading the counter if the SC fails.

In some cases, however, the processor may need to busy-wait, or spin-lock, on a memory location. For example, if an entry needs to be added to a table, multiple memory locations may need to be modified and updated in a consistent manner. This operation requires the use of the LL/SC sequence to implement a lock of the entire table.

In the art, a busy wait on a semaphore would normally be implemented in MIPS in a manner such as the following:

| L1: | LL  | T1, (T0)  |
|     | BNE | T1, 0, L1 |
|     | ORI | T1, 0, 1  |
|     | SC  | T1, (T0)  |
|     | BEQ | T1, 0, L1 |
|     | NOP |           |

In this case the thread is busy-waiting on the memory location addressed by the LL instruction until it succeeds with a read result which is zero (indicating the semaphore is unlocked). At that point a 1 is written to the memory location which locks the semaphore. In the preferred embodiment, if multiple streams are executing this code, the first stream will set the semaphore and continue. Another stream executing this same code will busy wait, continually testing the memory location. A third stream executing this code would stall since the second stream has locked the memory location containing the semaphore. The unlock operation is implemented with a simple store of 0 to the target address as follows:

U1: SW 0, (T0)

In a busy-wait situation such as this, rather than wasting CPU cycles repeatedly testing a memory location (for the second stream), or stalling a stream entirely (for the third and subsequent streams), it may be more efficient to stall each stream explicitly.

To increase CPU efficiency in these circumstances, a SIESTA instruction is provided in an embodiment of the present invention to be used in cases where the wait for a memory location is expected to be longer than a few instructions. The example shown above could be re-written in the following way:

| L1: | LL     | T1, (T0)  |
|     | BEQ    | T1, 0, L2 |
|     | ORI    | T1, 0, 1  |
|     | SIESTA | 100       |
|     | J      | L1        |
|     | NOP    |           |
| L2: | SC     | T1, (T0)  |
|     | BEQ    | T1, 0, L1 |
|     | NOP    |           |

The SIESTA instruction takes one argument which is the number of cycles to wait. The stream will wait for that period of time and then again become ready for execution. The SIESTA instruction will clear the lock bit associated with the stream in which it is executed and clear any stall bits in other streams that are set for the same memory location. This will allow other streams that are stalled on the same memory location to proceed.

If an interrupt occurs during a siesta, the sleeping thread will service the interrupt with its EPC set to the instruction after the SIESTA instruction. A SIESTA instruction may not be placed in the delay slot of a branch. If the count field is set to all 1's, then there is no cycle count and the context will wait until interrupted.

By forcing an explicit stall, the SIESTA instruction allows more efficient use of processor resources. In cases that the busy wait is expected to be very long, it may be better for the stream to self pre-empt, saving its state and switching in another thread.

Multi-processor Considerations

In an environment in which multiple DMS processors enabled according to embodiments of the present invention are running together from shared memory, the usual LL/SC thread synchronization mechanisms work in the same way from the standpoint of the software as for single-streaming processors. The memory locations which are the targets of LL and SC instructions must be in pages that are configured as shared and coherent, but not exclusive. When the SC instruction is executed, it sends an invalidation signal to other caches in the system. This will cause SC instructions on any other processor to fail. Coherent cache invalidation occurs on a cache line basis, not on a word basis, so it is possible for a SC instruction to fail on one processor when the memory location was not in fact modified, but only a nearby location was modified by another processor.

In an alternative embodiment, the lock mechanism described above may be implemented with more than one register associated with each stream. In this case, it is possible to have multiple locks set simultaneously for a given stream. The lock bit for a given lock is only cleared when the associated stream executes an SC instruction for a memory location for which the lock is set.

In another alternative embodiment, the lock mechanism may be implemented within the shared memory resource itself rather than through the use of registers. For example a shared cache memory may include a lock bit and a stream number for each stored cache line. In this case each cache line records if it is locked and which stream has it locked. The cache line in this embodiment also records which streams are stalled waiting for the lock.

It will be apparent to one with skill in the art that the methods and apparatus of the present invention, described with examples above in enabling detail may be utilized within any DMS processor regardless of internal priority states that may exist with regard to thread processing and stream assignment. Although only 4 processing streams are illustrated in the DMS processor described in FIG. 6 and in FIG. 7, there are actually eight processing streams in DMS processors of this specification. The inventors have chosen to illustrate just 4 streams in this specification in order to reduce complexity in explanation of the present invention.

The methods and apparatus of the present invention may be practiced whenever there are two or more streams attempting to access the same memory address in a shared memory. The spirit and scope of the present invention is limited only by the claims that follow.

What is claimed is:

1. A multi-streaming processor, comprising:
   a plurality of streams for streaming one or more instruction threads; and
   a lock mechanism for locking selected memory locations shared by the plurality of streams,
   wherein for each of the selected memory locations the lock mechanism is configured to store:
   a lock indication which indicates whether a corresponding memory location is locked; and
   one or more stall indications, each of which identify a stream of the plurality of streams that is stalled waiting for a locked memory location to become unlocked.

2. The multi-streaming processor of claim 1, wherein for a given locked memory location the lock mechanism is further configured to:
   detect an instruction which causes any corresponding streams that are stalled to become un-stalled prior to the given locked memory location becoming unlocked.

3. The multi-streaming processor of claim 2, wherein said instruction is executing within a particular stream, and wherein the instruction further indicates a period of time the particular stream will wait before resuming execution.

4. The multi-streaming processor of claim 3, wherein the instruction is included in an instruction sequence configured to support an atomic read-modify-write operation.

5. The multi-streaming processor of claim 1, wherein the lock mechanism is configured to:
   set a lock for a given memory location when an atomic memory sequence is started; and
   clear the lock when an atomic memory sequence is completed.

6. The multi-streaming processor of claim 1, wherein said selected memory locations are memory locations of a cache shared by the plurality of streams.

7. The multi-streaming processor of claim 6, wherein each memory location comprises a cache line, and wherein each of said cache lines is configured to store one of said lock indications and one or more of said stall indications.

8. The multi-streaming processor of claim 7, wherein the lock indication comprises a lock bit, and each of the one or more stall indications comprise a stream number.

9. A method for implementing atomic memory sequences in a multi-streaming processor, comprising:
   detecting an atomic access by a first stream of a plurality of streams to a selected memory location of a plurality of memory locations, wherein said plurality of memory locations are shared by the plurality of streams;
   storing a lock indication associated with the selected memory location, in response to the detected access;
   detecting a subsequent access by a second stream to the selected memory location while the memory location is locked; and
   storing a stall indication associated with the selected memory location which indicates the second stream is stalled,
   wherein each of said memory locations is configured to store a lock indication and one or more stall indications.

10. The method of claim 9, wherein for a given locked memory location the method further comprises:
    detecting a particular instruction; and
    un-stalling any corresponding streams which are stalled prior to the given locked memory location becoming unlocked, in response to the particular instruction.

11. The method of claim 10, wherein said particular instruction is executing within a particular stream, and wherein the instruction further indicates a period of time the particular stream will wait before resuming execution.

12. The method of claim 11, wherein the instruction is included in an instruction sequence configured to support an atomic read-modify-write operation.

13. The method of claim 9, further comprising:
    setting a lock for a given memory location when an atomic memory sequence is started; and clearing the lock when an atomic memory sequence is completed.

14. The method of claim 9, wherein said selected memory locations are memory locations of a cache shared by the plurality of streams.

15. The method of claim 14, wherein each memory location comprises a cache line, and wherein the method comprises storing for each of said cache lines one of said lock indications and one or more of said stall indications.

16. The method of claim 15, wherein the lock indication comprises a lock bit, and each of the one or more stall indications comprise a stream number.

* * * * *